US012375880B2

(12) United States Patent
Rice et al.

(10) Patent No.: US 12,375,880 B2
(45) Date of Patent: **\*Jul. 29, 2025**

(54) METHODS AND SYSTEMS FOR DETERMINING SIGNAL LEAKS IN A NETWORK

(71) Applicant: Comcast Cable Communications, LLC, Philadelphia, PA (US)

(72) Inventors: Daniel Rice, Denver, CO (US); John Chrostowski, Denver, CO (US); Benny Lewandowski, Denver, CO (US); De Fu Li, Denver, CO (US); Robert Gaydos, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,759

(22) Filed: Jul. 19, 2023

(65) Prior Publication Data

US 2024/0048941 A1 Feb. 8, 2024

Related U.S. Application Data

(63) Continuation of application No. 17/221,409, filed on Apr. 2, 2021, now Pat. No. 11,758,362.

(51) Int. Cl.
*H04W 4/029* (2018.01)
*H04B 17/318* (2015.01)
(Continued)

(52) U.S. Cl.
CPC .......... *H04W 4/029* (2018.02); *H04B 17/318* (2015.01); *H04L 1/0003* (2013.01);
(Continued)

(58) Field of Classification Search
CPC ..... H04W 4/029; H04W 4/027; H04W 24/04; H04W 24/08; H04B 17/318; H04L 1/0003; H04L 5/001
(Continued)

(56) References Cited

U.S. PATENT DOCUMENTS 6,002,671 A * 12/1999 Kahkoska ............. H04M 3/304
348/192
6,425,132 B1 * 7/2002 Chappell ............ H04N 7/17309
348/180
(Continued)

OTHER PUBLICATIONS

Data-Over-Cable Service Interface Specifications DOCSIS® 3.1; CM-SP-PHYv3.1-I07-150910; 244 pages; Cable Television Laboratories, Inc. 2013-2015.

*Primary Examiner* — Mong-Thuy T Tran
(74) *Attorney, Agent, or Firm* — Ballard Spahr LLP

(57) ABSTRACT

Signals used to test for upstream signal leaks in a hybrid fiber-coaxial (HFC) network may be interleaved with client data and strategically timed to be received by a leak detection device with a one-hundred percent probability of intercept. A method includes receiving an indication that a user device is in proximity to a computing device. The method includes determining, based on the indication that the user device is in proximity to the computing device, signal information. The method includes causing, based on the signal information, the user device to output a signal. The method includes determining, based on an indication that the signal was received by the computing device, a location of a network leak.

35 Claims, 10 Drawing Sheets

(51) Int. Cl.
   *H04L 1/00*       (2006.01)
   *H04L 5/00*       (2006.01)
   *H04W 4/02*       (2018.01)
   *H04W 24/04*      (2009.01)
   *H04W 24/08*      (2009.01)

(52) U.S. Cl.
   CPC ............ *H04L 5/001* (2013.01); *H04W 4/027* (2013.01); *H04W 24/04* (2013.01); *H04W 24/08* (2013.01)

(58) Field of Classification Search
   USPC ....................................................... 455/456.1
   See application file for complete search history.

(56) References Cited

U.S. PATENT DOCUMENTS 8,856,850  B2     10/2014  Sala et al.
   9,565,580  B2     2/2017   Zinevich
   9,832,089  B2     11/2017  Zinevich
   10,715,213 B1     7/2020   Stelle, IV et al.
   10,911,901 B2 *   2/2021   Huber .................. H04W 4/029
   11,012,763 B2     5/2021   Solomon et al.
   11,758,362 B2 *   9/2023   Rice ...................... H04W 4/027
                                                         455/456.1
   2014/0105251 A1   4/2014   Bouchard
   2014/0269867 A1   9/2014   Meller et al.
   2015/0029869 A1 * 1/2015   Wolcott ................. H04B 3/487
                                                         370/242
   2015/0181442 A1   6/2015   Zinevich
   2015/0341810 A1   11/2015  Murphy
   2016/0036492 A1   2/2016   Williams et al.
   2016/0057638 A1 * 2/2016   Zinevich ............. G01R 31/002
                                                         455/424
   2016/0119662 A1   4/2016   Zinevich
   2017/0244695 A1   8/2017   Lund et al.
   2017/0272184 A1   9/2017   Zinevich
   2018/0095121 A1 * 4/2018   Gilson .................. H04L 1/0675
   2018/0159590 A1   6/2018   Williams
   2018/0219621 A1   8/2018   Zinevich
   2018/0294837 A1   10/2018  Chapman et al.
   2021/0044846 A1   2/2021   Zinevich
   2021/0132133 A1 * 5/2021   Wolcott ............... G01R 31/086
   2021/0135755 A1   5/2021   Zinevich
   2021/0226664 A1   7/2021   Couch et al.
   2021/0250196 A1   8/2021   Das et al.
   2021/0285841 A1   9/2021   Bouchard
   2022/0006542 A1   1/2022   Stelle, IV et al.
   2022/0200715 A1   6/2022   Zinevich
   2022/0299556 A1 * 9/2022   Wolcott ................. H04W 4/33
   2022/0322037 A1   10/2022  Rice et al.
   2023/0024011 A1 * 1/2023   Couch ................... G01R 31/08
   2024/0147271 A1   5/2024   Primerano et al.

* cited by examiner

| SPEED (MPH) | DISTANCE (FT) | RATIO R MAX / R MIN, % ||||| 
|---|---|---|---|---|---|---|
| | | R MIN = 30FT | R MIN = 40FT | R MIN = 60FT | R MIN = 80FT | R MIN = 100FT |
| 20 | 29.3 | 1.11 | 1.07 | 1.03 | 1.02 | 1.01 |
| 30 | 44.0 | 1.24 | 1.14 | 1.07 | 1.04 | 1.02 |
| 40 | 58.8 | 1.40 | 1.24 | 1.11 | 1.07 | 1.04 |
| 50 | 73.3 | 1.58 | 1.36 | 1.17 | 1.10 | 1.07 |
| 60 | 88.8 | 1.78 | 1.49 | 1.24 | 1.14 | 1.09 |

METHODS AND SYSTEMS FOR DETERMINING SIGNAL LEAKS IN A NETWORK

CROSS REFERENCE TO RELATED PATENT APPLICATION

This application claims priority to U.S. Non-Provisional application Ser. No. 17/221,409 filed Apr. 2, 2021 which is herein incorporated by reference in its entirety.

BACKGROUND

System leakage monitoring is an integral and extremely important aspect of system maintenance. Federal Communications Commission (FCC) signal leakage regulations (e.g., Federal Communications Commission (FCC) regulations, FCC part 76, etc.) demand that signals (e.g., wireless signals, etc.) from and/or associated with a network (e.g., a cable network, a hybrid fiber-coaxial (HFC) network, an Internet service provider (ISP) and/or any other service provider network, etc.) adhere to basic signal leakage performance criteria (e.g., signal frequency, electric field strength, signal power level, etc.). Operators are expanding the upstream spectrum to aeronautical band frequencies of 204 MHz or greater to achieve higher upstream speeds for broadband and to manage network capacity cable. For example, the upstream spectrum is expanding to 204 MHz which overlaps the 108 MHz-137 MHz aeronautical band. By adopting this spectrum for upstream, the power profile changes where the signals are highest in a home and lowest at the electrical to optical conversion in an HFC network. Flexible coax and network connections in the home and/or on the home side of the HFC network may be more fragile than the "hardline" coaxial cables used in the main/primary portion of the network, causing the home and/or on the home side of the HFC network to often be a source of signal leakage. Existing leakage testing solutions are unable to effectively determine the existence of upstream signal leakage, which currently resides below 42 MHz outside of the leakage regulation bands, in an HFC network without service interruption and/or determinant to client/user data (e.g., service interruptions, etc.).

SUMMARY

It is to be understood that both the following general description and the following detailed description are exemplary and explanatory only and are not restrictive. Methods and systems for determining signal leaks in a network are described.

A computing device (e.g., a cable modem termination system (CMTS) device, a high-speed data services device, a gateway/server device, a network device, etc.), for example, owned, manage, and/or maintained by a service provider (e.g., an Internet service provider, a content service provider, a communication service provider, a multiple-service operator (MSO), etc.) may send one or more signals (e.g., network analysis signals, orthogonal frequency-division multiplexing (OFDM) upstream data profile (OUDP) test signals, command signals, etc.) to a user device (e.g., a cable modem, a network device, etc.) at a user premises to cause the user device to generate an output signal (e.g., an upstream OFDMA signal, etc.) that may be used to determine the existence of leaks in a hybrid fiber-coaxial (HFC) network. Timing/scheduling on when to cause the computing device to send one or more signals to a user device to determine the existence of a leak may be based on, for example, the proximity of a leak detection device to the user device and/or a velocity associated with the leak detection device. The signal caused to be output by the user device may be interleaved with regular user output data (e.g., IP traffic, network data/information, etc.) so that the actual signal that is a potential leak source in the HFC network is the same signal that is detected, for example, by the leak detection device.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
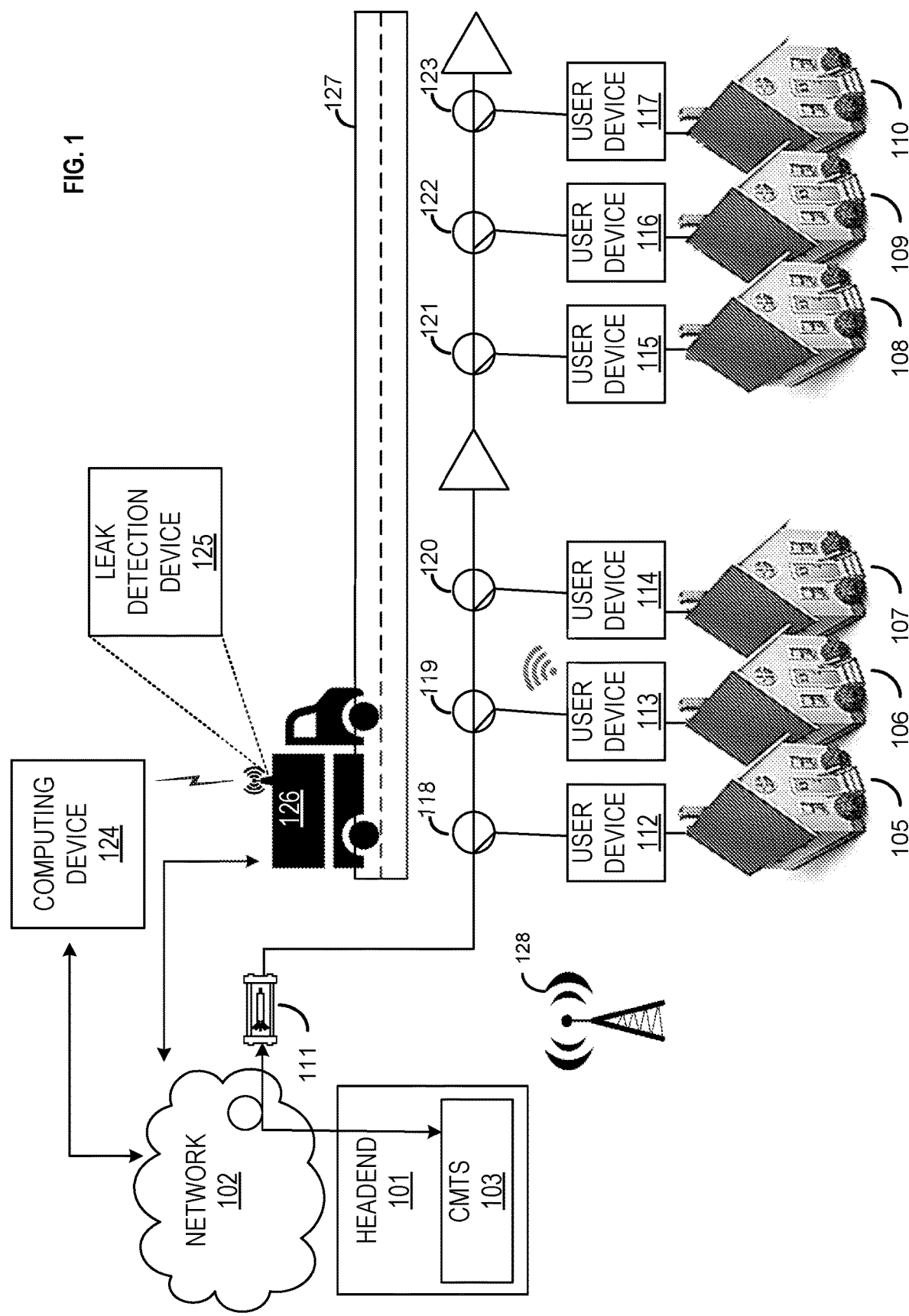
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It ma be understood that this language may in some cases mean that a system (e.g., a computer) owned and/or controlled by the given entity is actually performing the action.

Signals used to test for upstream signal leaks in a hybrid fiber-coaxial (HFC) network may be interleaved with client data and strategically timed to be received by a leak detection device with a one-hundred percent probability of intercept.

FIG. 1 shows a system 100. The system may include a network 102. The network 102, may include a packet-switched network (e.g., an Internet protocol-based network), a non-packet switched network (e.g., quadrature amplitude modulation-based network), and/or the like. The network 102 may include network adapters, switches, routers, modems, and the like connected through wireless links (e.g., radiofrequency, satellite, etc.) and/or physical links (e.g., fiber optic cable, coaxial cable, Ethernet cable, or a combination thereof). The network 102 may include public networks, private networks, wide area networks (e.g., Internet), local area networks, and/or the like. The network 102 may include a content access network, a content distribution network, and/or the like. The network 102 may be configured to provide communication from telephone, cellular, modem, and/or other electronic devices to and throughout the system 100. The network may include, for example, a hybrid fiber-coaxial (HFC) network. For example, the network 102 may employ and/or facilitate various methods for sending desired signals over a coaxial cable such as any version of Data Over Cable Service Interface Specification (DOCSIS). The network 102 may support and/or facilitate low-split, mid-split, and high-split configurations. For a low-split configuration, the network 102 may support/facilitate upstream frequencies below 42 MHz and/or the like. For a mid-split configuration, the network 102 may support/facilitate frequency division schemes that facilitates bidirectional traffic on a single coaxial cable, where reverse channel signals propagate to a headend 101, for example, from 5 to 85 MHz, and where forward path signals go from the headend 101 from 102 MHz to the upper frequency limit. A duplex crossover band may be located from 85 to 102 MHz. For a high-split configuration, the network 102 may support/facilitate downstream frequencies of 258-1002 MHz and upstream frequencies are 5-204 MHz. With the increased bandwidth of the high-split configuration in the upstream direction, the Aeronautical Frequency Band (108-137 MHz) that was in the downstream direction in low-split and mid-split networks may reside in the upstream spectrum.

The headend 101 may be, for example, a facility configured to receive, process, and distribute content and/or media signals, such as including video, audio, and data signals, within the network 102. The headend 101 may be maintained and/or managed by a content and/or media service provider, such as a cable television (CATV) provider or an Internet service provider (ISP). The headend 101 may include any reasonably suitable electrical equipment for receiving, storing, and/or re-transmitting content/media signals, such as content/media servers, satellite receivers, modulators/demodulators, edge decoders, and/or the like. For example, the headend 101 may include a cable modem termination system (CMTS) 103.

The CMTS 103 may be an intermediary between user devices 112-117 (e.g., cable modems, multimedia terminal adapters (MTA), set-top boxes, network terminals, etc.) and a backbone network/portion (e.g. the Internet) of the network 102. The CMTS 103 may forward/send data received from a backbone network to the user devices 112-117 and forward data received from the user devices 112-117 onto the backbone network. The CMTS 103 may comprise an optical transmitter and an optical receiver transmitting and/or receiving messages from the user devices 112-117. The CMTS 103 may include transmitters and/or receivers for communicating with the backbone network. The CMTS 103 may include a converter that may convert any protocol used within the backbone network to a protocol suitable for data communication with the user devices 112-117. For example, the CMTS 103 may, send/transmit signals (e.g., media signals, broadband signals, content signals, etc.) downstream to users/subscribers 105-110, via a fiber-optic connection/communication link to a fiber optic node 111 supporting the users/subscribers 105-110. The fiber optic node 111 may, for example, receive and convert optical signals sent from the headend 101 to RF signals that are sent to the users/subscribers 105-110 via distributed taps 118-123 (e.g., subscriber taps, etc.) distributed via coaxial cables to the user devices 112-117, respectively.

The user devices 112-117 may be any devices that are configured to communicate with the CMTS 103 and/or any devices, for example, within a local network of the respective users/subscribers 105-110 premises. For example, the user devices 112-117 may be configured to interface with a display, an Internet of Things (IoT) device, a mobile device, one or more sensors, and/or the like. The user devices 112-117 may be configured to interface with any local network device with an Internet Protocol (IP) and/or Media Access Control (MAC) address, such as a local computer, a wired and/or wireless router, a local content server, and/or the like. The user devices 112-117 may forward data/information received from the CMTS 103 to any devices, for example, within a local network of the respective users/subscribers 105-110 premises, and may forward data received from any device to the CMTS 103. The specific configuration of the user devices 112-117 may vary. Each of the user devices 112-117 may include a converter that may convert signals and/or data/information to signals and/or data/information suitable for any devices, for example, within a local network of the respective users/subscribers 105-110 premises.

The CMTS 103 may be configured to schedule all upstream and downstream transmissions across the system 100. The CMTS 103 may send each of the user devices 112-117 data/instructions for communicating/receiving downstream transmissions and communicating/sending upstream transmissions. The CMTS 103 may assign each of the user devices 112-117 one (or more) modulation profiles. A modulation profile is a list of modulation orders or bit loading configurations, defined for each subcarrier within an OFDMA channel or each minislot in an OFDMA channel. For example, the user devices 112-117 may each send/transmit a configurable number of OFDMA frames upstream toward the CMTS 103 as part of a transmission burst. An OFDMA frame may be a communication burst of a specified duration comprising a signal with a plurality of frequency-based subcarriers. An OFDMA frame may comprise a configurable number of OFDMA symbols with smaller durations than the OFDMA frame. OFDMA symbols may comprise a configurable number of minislots, where minislots may form an OFDMA frame and may comprise less than all frequencies in the OFDMA symbol with multiple minislots per OFDMA frame. In other words, an OFDMA frame may include any number of symbols. An OFDMA frame may include any number of minislot, and each minislot may be uniquely mapped to a group of subcarriers.

The system 100 (e.g., the computing device 124, the CMTS 103, etc.) may allocate OFDMA minislots to the user devices 112-117 for upstream transmission. The CMTS 103 may consider upstream transmission requests from the user devices 112-117 received, for example, in a DOCSIS request message, such as service addition requests, service change requests, or any other request noted in the most recent DOCSIS 3.1 standard documents including CM-SP-PHYv3.1-I02-140320, CM-SP-MULPIv3.1-I02-140320. In the context of upstream bandwidth requests, the system 100 may utilize a Q-Depth BW-Request and/or the like.

The CMTS 103 may consider the amount of data each user devices 112-117 attempts to send/transmit along with connectivity constraints (e.g. signal-to-noise ratios, power constraints, etc.) associated with each of the user devices 112-117, for example, based on an associated bit loading profile, and may assign appropriate OFDMA minislots to each the user devices 112-117.

The CMTS 103 may receive media access instructions/configurations for all upstream transmissions, for example, from the computing device 124. The CMTS 103 may send/broadcast the instructions/configurations, for example, via a UL-MAP message comprising the instructions/configurations to each of the user devices 112-117. The message may indicate minislot allocations/numbers, specify OFDMA subcarriers to be employed along with a byte or a bit count, and/or indicate a transmission duration. An upstream burst scheduled to individual user devices may be referred to as a Map Information Element, which may include SID, IUC, and an offset (indicating the burst length). The CMTS 103 may also indicate pilot signals to be employed by the user devices 112-117 during transmission. The pilot symbols or subcarriers may be placed in the upstream transmissions from the user devices 112-117 to enable the CMTS 103 to distinguish timing and signal requirements between transmissions from different user devices 112-117. A pilot pattern may be associated with an IUC. A unicast SID may be uniquely assigned to a user device. The burst region may be uniquely described by SID, IUC, and offset. Pilot symbols may or may not comprise data. All signals in a minislot may employ the same modulation order and/or pilot pattern. Signals in different minislots may include different modulation orders and/or pilot patterns. Pilot signals may include the same modulation order as other pilot signals in a minislot, yet with a lower modulation order than data signals in the minislot.

Minislots may be allocated based on predefined rules for the system 100. For example, each OFDMA frame may comprise a plurality of OFDMA symbols. Each OFDMA symbol may comprise a plurality of subcarriers. Minislots may be selected so that each minislot has the same bit-loading capacity. Such a minislot selection may result in varied numbers of active frequencies, tones, subcarriers, etc., as some subcarriers may comprise differing bit-loading capacities than other subcarriers. Minislots may also be selected so that each minislot comprises the same number of active subcarriers, but a different bit loading capacity. For example, a minislot with a subcarrier spacing of 25 kHz may comprise 16 data subcarriers, while a minislot with a subcarrier spacing of 50 kHz may comprise 8 data subcarriers. When the channel is configured, for example, for 25 kHz subcarrier space, the number of subcarriers per minislot may be fixed at 16. When the channel is configured, for example, for 50 kHz, the number of subcarriers per minislot may be fixed at 8. In both cases, a minislot may be 400 kHz wide. Such minislots may be dynamically configured by the CMTS 103 during allocation. All active subcarriers in a minislot may include the same QAM constellation/modulation order. Active subcarriers in different minislots may include different QAM constellation/modulation orders. Pilot signals may include different (e.g. lower, less efficient, more efficient etc.) QAM constellation/modulation orders than other data subcarriers in a same resource block. Both subcarriers and pilot signals may carry data. Minislots may also be defined to include only contiguous subcarriers. Bit loading of complementary pilots and/or data subcarriers may be constant in a minislot but may vary between minislots. The minislot is the logical unit for scheduling upstream bandwidth. Minislots may also employ any other transmission protocols. The system 100 may also employ Forward Error Correction (FEC) coding, and/or the like.

The CMTS 103 may also be configured to schedule all upstream and downstream transmissions across the system 100, so that transmissions between the CMTS 103 and the user devices 112-117 may be separated in the time and/or frequency domain, which may allow the transmissions to be separated at an associated destination when received at the CMTS 103. Although only the CMTS 103 is shown, the system 100 may include a plurality of CMTS 103. For example, CMTS 103 (and a computing device 104) may represent a virtual CMTS (vCMTS) configuration/system where compute and signal processing components may be distributed through out the network 102. For example, the CMTS 103 may be and/or represent a distributed access architecture that includes a function and/or application located in a data center (e.g., the headend 101, etc.) and/or configured with a network device (e.g., the computing device 124, etc.) that schedules and manages data/traffic, and a function and/or application that operates in fiber optic node 111 that converts the format of an optical signal to any spectrum bands. The system 100 may support any CMTS arrangement, such as a legacy CMTS system/architecture and/or DAA virtual CMTS implementation.

Each CMTS 103 may share a synchronous time reference. The synchronous time reference may be used, for example, by each CMTS 103 when outputting an OFDMA signal according to the DOCSIS 3.1 specification and/or the like. For example, OFDMA signals, formed by different CMTS 103 devices may be synchronized from a common clock reference (e.g., GPS clock, etc.).

An allocation of time and/or frequency resources may be sent/transmitted to the user devices 112-117 via Uplink Media Access Plan (UL-MAP) messages, Downlink Media Access Plan (DL-MAP) messages, and/or the like. The CMTS 103 may assign each of the user devices 112-117 one (or more) profiles on its own. For example, the CMTS 103 may assign each of the user devices 112-117 a modulation profile based on internal logic and/or commands originating from a computing device 124 (e.g., a server, a gateway, a network device, a modulation profile management device, etc.). For example, the computing device 124 may be configured and/or integrated with a profile management application (PMA) used to assign each of the user devices 112-117 a modulation profile. The CMTS 103 may send the computing device 124 data/information to update, modify and/or adjust a profile based on, for example, network conditions, a current configuration, and/or outcomes of modulation profile testing.

The computing device 124 may be configured to collect/gather any data/information necessary for determining a profile. The computing device 124 may communicate with the CMTS 103 to initiate modulation profile tests, provide new or optimized modulation profiles, and/or send suggestions and/or commands to use these modulation profiles to the CMTS 103. For example, the computing device 124 may send instructions to the CMTS 103 and the CMTS 103 may send MAC Management Messages (MMMs) to the user devices 112-117 to collect any data/information necessary for determining a profile and send the data/information back to the computing device 124. The computing device 124 may send recommendations for the profiles to the CMTS 103. The CMTS 103 may configure the user devices 112-117 to use a profile at an appropriate time. For example, the CMTS 103 may configure the user devices 112-117 to send data/information based on a profile that may be used to determine/detect signals leaks within the system 100.

The system 100 may be configured to detect/determine signal leaks within, for example, an HFC network (e.g., a high-split HFC, etc.). The system 100 may be configured to employ/facilitate different signal leak detection methods, such as any traditional signal leak detection method. For example, the system 100 may be configured for signal leakage detection based on: detection of low-level inserted carrier signals, direct quadrature amplitude modulation (QAM) detection using correlation processing, and detection of harmonics of orthogonal frequency division multiple access (OFDMA) and/or orthogonal frequency-division multiplexing (OFDM) continuous pilots, and/or the like. For detection of low-level inserted carrier signals, the system 100 may enable/facilitate two continuous-wave carriers being inserted into the network, at either a hub of the headend 101, at a remote physical layer node component of the CMTS 103, and/or at a media access control channel physical layer node, and the leakage signal may be captured using a Fast Fourier Transform (FFT) transfer detector (e.g., a leak detection device 125, a computing device, a signal analysis device, etc.). Carriers may be configured to be, for example, 30 dBc, relative to the single carrier QAM digital channel power. For direct QAM detection using correlation processing, the system 100 may enable/facilitate downstream signal samples to be captured at the headend 101 at a desired leakage detection frequency. The signal samples may be time-stamped using a GPS reference clock and sent/transmitted to the FFT detector. The FFT detector may receive signals leaking from the HFC network 102, time stamps the received signals, and apply a cross-correlation process on the two signal sets to resolve the detected leak. For detection of harmonics of OFDMA continuous pilots, the system 100 may enable/facilitate an FFT detector (e.g., the leak detection device 125, a computing device, a signal analysis device, etc.) to capture a leakage signal with no additional tagging or continuous wave signal inserted into the HFC network 102. Detected signals are the existing harmonics of the OFDMA continuous pilots.

When the HFC network 102 (and/or the system 100) is configured as a high-spit HFC network, upstream signals (e.g., data/information, etc.) from the user devices 112-117 may be inherently burst-like in nature with potential leakage detection signals being output/generated incoherently. Multiple user devices 112-117 sending/transmitting leakage tones at the same time and frequency may cause constructive and/or destructive signal combining because of the different phases of the signal—ultimately creating a high likelihood of inaccurate leakage detection measurements. Furthermore, upstream leakage detection signals may be in burst mode operation, as opposed to continuous mode downstream tones, to limit the impact on upstream capacity and to protect the upstream power budgets of the optical components.

For reliable/accurate signal leak detection in an HFC network (e.g., a high-split (204/258 MHz) HFC, etc.), the system 100 may enable/facilitate OFDMA upstream data profile (OUDP) burst test signaling (BTS). The system 100 may use an OUDP burst that is generated by each of the user devices 112-117, and used to detect and monitor leakage in the aeronautical band of the high-split HFC network. The system 100 may facilitate/enable any predefined OUDP pilot patterns within the DOCSIS specification. For example, the system 100 may use DOCSIS pilot patterns 11 and/or 4 as they contain the densest concentration of pilots. Detection of the signal may be realized by utilizing a matched filter for the predefined pilot pattern. Scheduling and overall configuration of the user devices 112-117 OUDP burst signals may be executed via the CMTS 103. OUDP burst test signal (BTS) has several advantages, for example, not having to modify existing DOCSIS (e.g., DOCSIS 3.1, etc.) specifications for upstream signal generation requirements of the user devices 112-117, and not having to update the firmware in user devices 112-117 to add the capability of generating continuous-wave carriers.

For example, scheduling and configuration of a leak detection signal(s), for example, OUDP BTS and/or the like, may be based on data/information communicated between the computing device 124 and the CMTS 103. The computing device 124 may receive and/or store any information associated with the CMTS 103 and/or the network 102, such as service area/boundary information, device service group information, and/or the like. The computing device 124 may receive/retrieve, for example, via Google RPC (gRPC), Simple Network Management Protocol (SNMP), direct access telnet, wireless communication, and/or the like signal parameters, such as OFDMA signal parameters and/or the like, from the CMTS 103. The computing device 124 may use the signal parameters to determine/generate signal signatures, such as OFDMA signal signatures, for the CMTS 103. The signal signatures may be used in the system 100 for cross-correlation detection of network leaks, such as OFDMA leakage signals. The signatures may be based, at least in part, on subcarriers that are part of the structure of an OFDMA signal.

The computing device 124 may be in communication, for example, wireless communication, and/or the like, with the leak detection device 125 (e.g., an FFT detection device, a computing device, a signal analysis device, etc.). The leak detection device 125 may be configured with and/or located within, for example, a vehicle 126. The vehicle 126, although shown to be a truck, may be any type of vehicle, mobile device, and/or moving object, such as a car, a bicycle, an autonomous vehicle/drone, an aircraft, a watercraft, human-powered and/or facilitated mobility, and/or the like. Although the leak detection device 125 is shown to be configured with the vehicle 126, the leak detection device 125 may be configured and/or associated with any type of device, such as a mobile device, a smart device, a computing device, a personal computing device, and/or the like.

The vehicle 126 and/or the leak detection device 125 may travel a path 127. The path 127 may be, for example, a service area of and/or supported by the CMTS 103. The leak detection device 125 may be configured with a global positioning system (GPS) sensor/antenna configured to, either periodically or consistently, determine and/or record the location (e.g., current GPS coordinates, etc.) of the leak detection device 125. The leak detection device 125 may also be synchronized to a GPS clock to establish timing consistent with the timing communicated between the CMTS 103 and the computing device 124. The leak detection device 125 may include a velocity meter, an accelerometer, a positioning sensor, and/or the like configured to, either periodically or consistently, determine the velocity, speed, and/or orientation of the leak detection device 125. The leak detection device may send the computing device 124 location information that includes a location (e.g., GPS coordinates, etc.) of the leak detection device 125 and a travel speed (e.g., velocity, etc.) of the leak detection device 125 and timing information associated with one or more determined/detected signal leaks.

The computing device 124 may communicate with the CMTS 103. The computing device 124 may receive location information (e.g., GPS coordinates, etc.) associated with the user devices 112-117 along the path 127. For example, the computing device 124, based on the location information associated with the leak detection device 125, may determine that the CMTS 103 (and/or the the computing device 124) is in proximity to and/or services the user devices along the path 127. The computing device 124 may receive information from CMTS 103 that includes, for example, the number of user devices (e.g., the user devices 112-117, etc.) along the path 126, the type of user devices, configuration details associated with the user devices the location information associated with the user devices, and/or any other information associated with the user devices.

Signaling and timing information, such as leak detection signaling and timing information may be determined, for example, by the computing device 124. For example, the computing device 124, based on the location and travel speed of the leak detection device 125 and the information associated with the user devices 112-117 received from the CMTS 103, may determine signaling and timing information, such as OUDP burst test signal (BTS) information. Signaling and timing information may include and/or indicate, for example, all user devices (e.g., the user devices 112-117, etc.) within a service group of the CMTS 103, a center frequency to be used for signaling, a number of minislots to be used, a frame count, a cycle number, status information, and/or the like.

Using OUDP burst as described, is advantageous in that it accommodates the overall time needed to generate OUDP test bursts. The CMTS 103 may cause/enable each of the user devices 112-117 to output a signal/test burst with a specific modulation and pilot pattern that may be detected by the leak detection device 125 at sufficient sensitivity (e.g., a specific modulation profile, PRBS, etc.). Pilot pattern 11 has the most pilots for 25 kHz subcarriers and utilizes a frequency band near the aeronautical band (e.g., 138 MHz, etc.).

The system 100 enables/facilitates sufficient time for data to be interleaved into a spectrum, as needed. The system 100 enables OUDP test bursts to be scheduled, for example, only when needed, to free spectrums for data bursts. The scheduling may be based on, for example, the location and travel speed of the leak detection device 125 and the information associated with the user devices 112-117. the scheduling may be used to ensure that at least one and/or each of the user devices 112-117 generate/output at least one signal that may be used for leak detection as the vehicle 126 (the leak detection device 125) passes through the service area of the CMTS 103.

Figure 2:
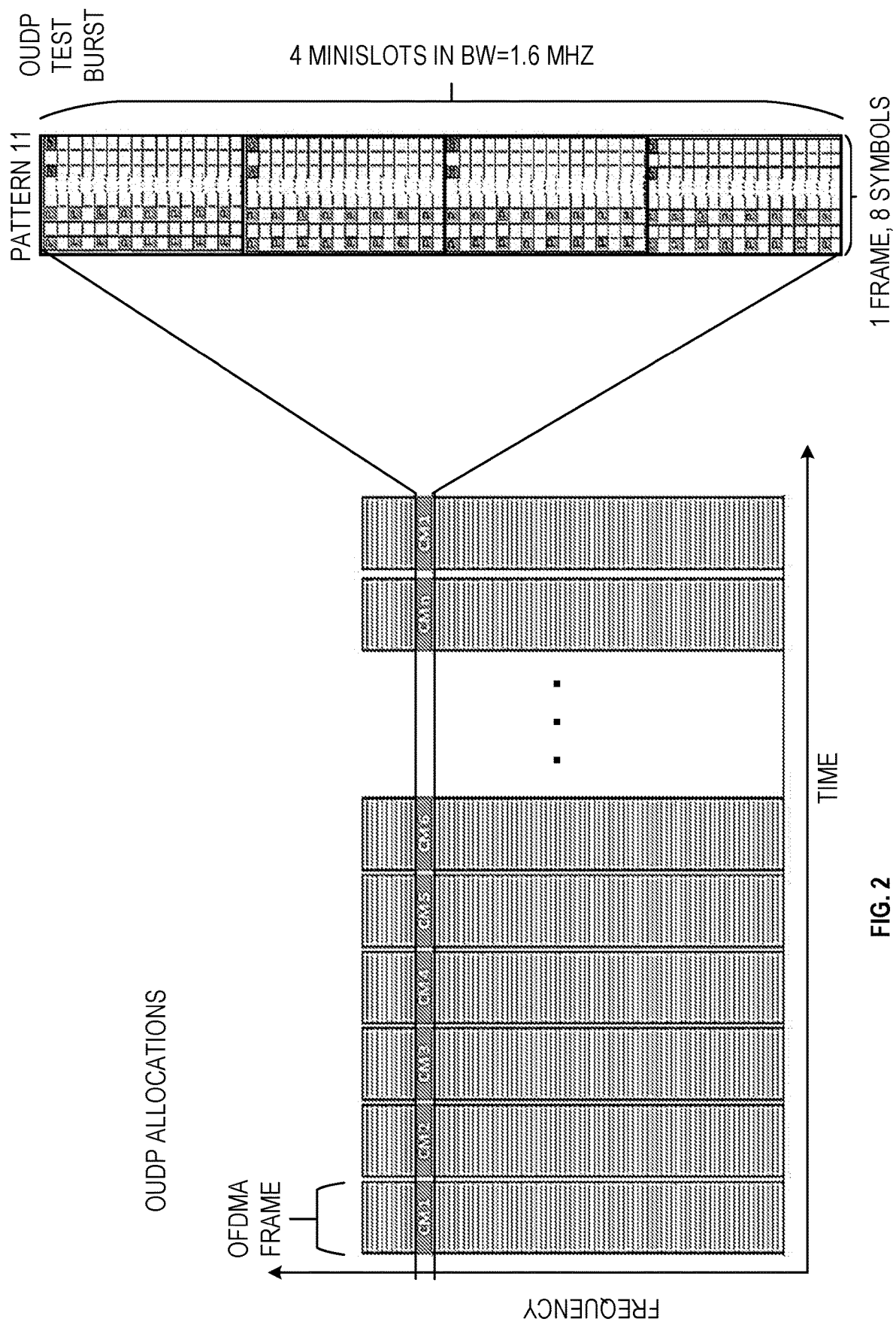
FIG. 2 shows an example data structure.

FIG. 2 shows an example leakage detection signal configuration based on OUDP BTS, with one frame of 8 symbols and 4 minislots depicted. Using an OFDMA OUDP burst allows flexible configuration options in optimizing frequency placement in the upstream band; minimizes any impact to the overall upstream bandwidth/throughput; optimizes duration to maximize the sensitivity of the leak detection device 125. The OFDMA OUDP burst may cycle through all the user devices 112-117 with an accurate/good probability of intercept (POI) for leakage measurements. An OUDP Burst signal may be configured in the high-split user devices 112-117 as, for example, 1 frame with 4 minislots, 64 pilots, 6 symbols per frame, and a duration of 270 μs; 2 frames with 4 minislots, 128 pilots, 6 symbols per frame, and a duration of 540 μs; 4 frames with 4 minislots, 256 pilots, 6 symbols per frame, and a duration of 1080 μs; or 8 frames with 4 minislots, 512 pilots, 6 symbols per frame, and a duration of 2160 μs. An OUDP Burst signal may be configured in the high-split user devices 112-117 based on any parameters.

Returning to FIG. 1, the computing device 124 may use OUDP Burst parameters defining an OUDP signal to cause the leak detection device 125 to generate a matching filter for detecting signal leaks. For example, the following parameters defining an OUDP signal may be used to generate a matched filter within the leakage detector 125:

Symbols Per Frame (K)=6 (**this parameter may be modified to improve network efficiency and robustness)
Modulation Order=64 QAM
Pilot Pattern=11
Center Frequency of OUDP Signal=136.0125 MHz
4 Minislots (1.6 MHz Upstream Bandwidth with the 4 adjacent minislots to the center frequency)
Number of Frames=8 and 2.16 ms in transmit time duration.
Transmit Power equal to the surrounding OFDMA P=1.6 MHz channel transmit power
4K Fast Fourier Transform (FFT)=40 μs per symbol+ Cyclic Prefix
Cyclic Prefix=5.0 μs (may be modified to improve network efficiency and robustness)
Window Roll off Period=0.9375 μs (**this parameter may be modified to improve network efficiency and robustness)

The pattern described above utilizes 8 frames of OUDP pilot pattern 11. The configuration provides the most pilot energy within an OUDP burst signal, which results in optimized sensitivity for signal leak detection, as compared to the other known variants. The methods described indicate that if there was the ability to define a new OUDP pilot pattern within the DOCSIS spec that contained an even more dense configuration of pilots, that would be a more spectrally efficient approach, yielding improved sensitivity.

The sensitivity of the leakage detector 125 (e.g., an OFDMA leak detector, etc.) may be determined as follows:

$$S_{OFDMA}(\text{dBmV/m}) = S_{OUDP}(\text{dBmV}) + AF(\text{dB/m}) + N(\text{dBc});$$

where: $S_{OUDP}$ (dBmV) is the sensitivity of the OUDP test signal receiver; AF (dB/m) is the antennas factor; N (dBc) is the coefficient of the recalculation level of the OFDMA signal in BW=6 MHz to the level of the signal at the output of the OUDP-matched filter. The sensitivity $S_{OUDP}$ may depend on: the number of pilots in the OUDP test burst, cyclic prefix duration, receiver noise figure, and detection threshold over noise floor. In a matched filter scenario, the energy of all pilots is coherently combined within time slot T of one OFDMA symbol, plus any cyclic prefix. So, the sensitivity $S_{OUDP}$ equals the sensitivity of the detection continuous-wave burst with duration, T, and level boosted K times, where K is the number of pilots in the OUDP test burst:

$$S_{OFDMA}(\text{dBmV/m}) = S_{CW-T}(\text{dBmV}) - 10 \text{ Log}(K).$$

For example, the antennas factor (AF) for a monopole antenna at 135 MHz is around 8 dB/m. The coefficient N is defined by the following:

$$N(\text{dBc}) = 10 \text{ Log}(M);$$

where: M is the number of subcarriers in BW=6 MHz. For 25 kHz spacing of an OFDMA signal, the number of subcarriers M is 240, and coefficient N equals 23.8 dBc. Thus, the sensitivity of the leakage detector 125 for 25 kHz spacing and T=45 μs (symbol 40 μs plus cyclic prefix 5 μs) may be estimated as follows:

$$S_{OFDMA}(\text{dBmV/m}) = S_{CW-T} - 10 \text{ Log}(K) + 8 + 23.8 = S_{CW-45} - 10 \text{ Log}(K) + 31.8;$$

where the sensitivity SCW-45 of detection CW burst with duration 45 μs is 13.47 dBc (in 22.2 times) worse than maximal sensitivity of detection CW burst with duration 1 ms and threshold 6 dB. Test show that in the case of OUDP, the detection threshold should be increased at least to 12 dB or on +6 dBc to prevent false alarms. Thus, the sensitivity SCW-45 may be estimated as follows:

$$S_{CW-45} = -85 \text{ dBmV} + 13.47 \text{ dBc} + 6 \text{ dBc} = -65.5 \text{ dBmV}$$

The sensitivity of the leakage detector 125 may be determined as:

$$S_{OFDMA}(\text{dBmV/m}) = -65.5 - 10 \text{ Log}(K) + 31.8 = -33.7 - 10 \text{ Log}(K)$$

As shown, increasing the sensitivity requires increasing the number of pilots. This means increasing the number of OUDP minislots and frames and using a pilot pattern with the maximum number of pilots (pattern 11 within the existing DOCSIS specifications). Table 1 shows the estimated sensitivity for pilot pattern 11 and different combinations of minislots and frames. This sensitivity is sufficient to meet the FCC's signal leakage requirements.

TABLE 1

Sensitivity for Pilot Pattern 11

| Number of minislots/ frame | Number of pilots (K) | Sensitivity | |
|---|---|---|---|
| | | dBmV/m | µV/m |
| 2/1 | 32 | −48.8 | 3.6 |
| 2/2 or 4/1 | 64 | −51.8 | 2.6 |
| 2/4 or 4/2 | 128 | −54.8 | 1.8 |
| 2/8 or 4/4 | 256 | −57.8 | 1.3 |
| 4/8 | 512 | −60.8 | 0.91 |

The computing device 124 may send the signal information and the timing information, such as OUDP Burst parameters, to the CMTS 103. The CMTS 103 may use the signal information and the timing information to cause each of the user devices 112-117 to output a test signal that may be used to determine the existence of a signal leak and/or the location of a user device associated with a signal leak.

Figure 3:
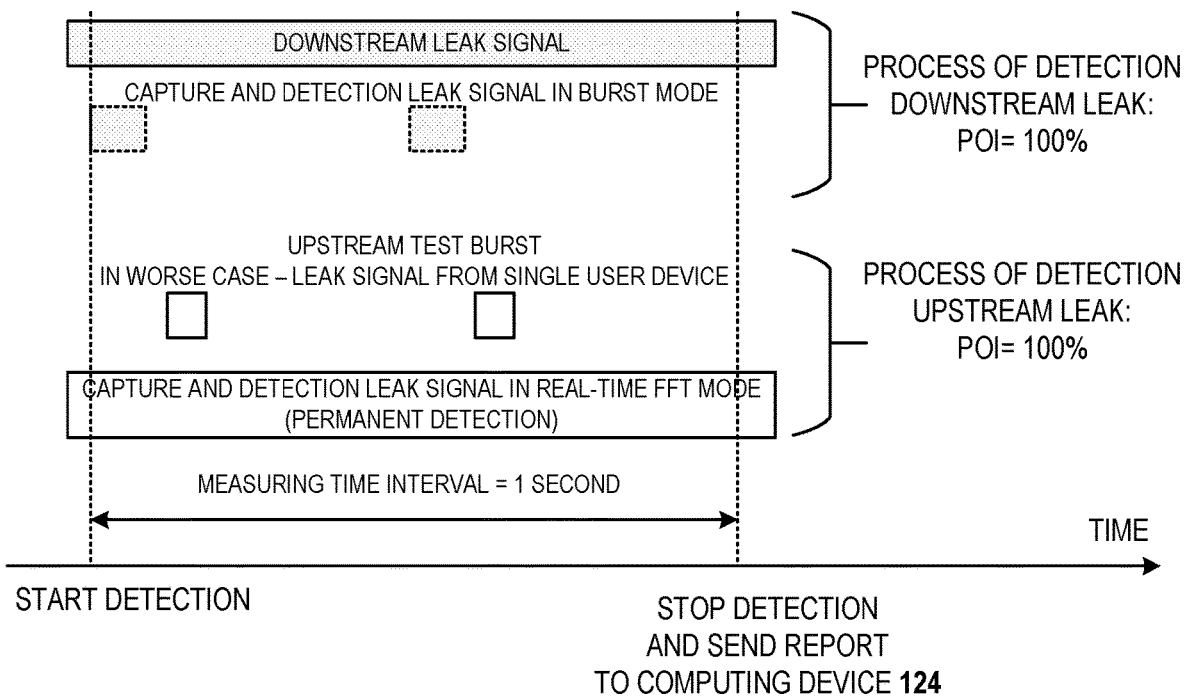
FIG. 3 is an example chart showing the probability of intercept (POI) based on the example methods.

Upstream test signals used for leakage detection may be intermittently transmitted and/or output (e.g., bursty in nature, etc.), so a careful examination needs to be conducted to assess how many bursts may be detected by the leak detection device 125 while traveling within the vehicle 126 (in a one-second time interval). The probability of intercept (POI) is the probability of capturing a transmitted signal based on Tx/Rx timing and should be 100% of the time. With the burst signal approaches, including burst CW or OUDP, the transmit duration and cycle time may be configured such that each of the user devices 112-117 transmits approximately 2× per second. The leak detection device 125 may be configured with a real-time FFT spectrum analyzer that is continuously on, so with certainty (timing-wise), signal detection will occur if the amplitude of the signal received by the leak detection device 125 is greater than the sensitivity (e.g., the minimal detected leak level, etc.) of the leak detection device 125. FIG. 3 shows an example POI for leak detection within the system 100.

Figure 4:
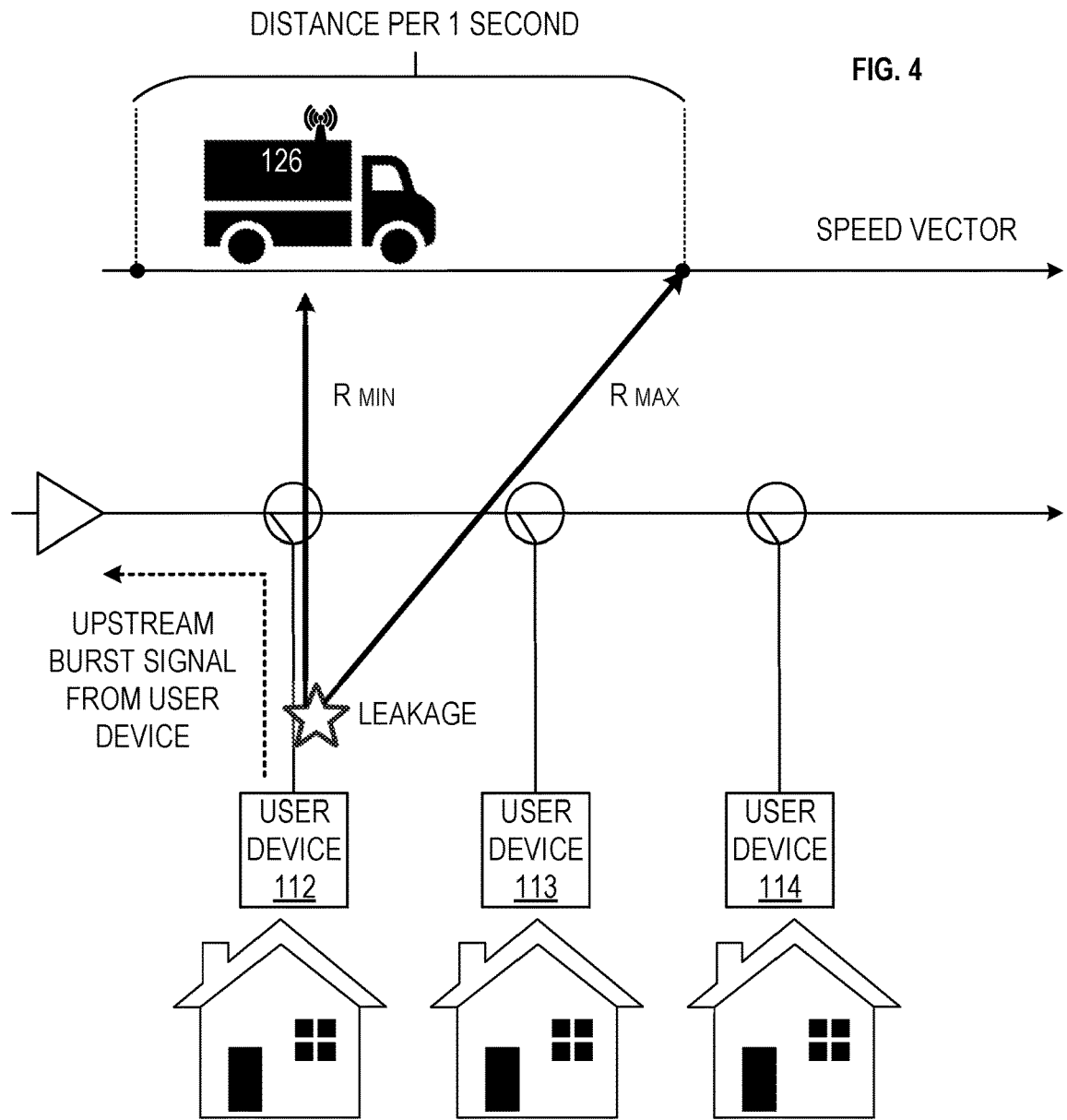
FIG. 4 shows an example system.

FIG. 4 shows example results that compare the ratio of the minimum to maximum distance the vehicle 126 may travel before the leak detection device 125 receives a burst signal from a user device (e.g., the user devices 112-117, etc.). The ratio allows an estimate of the change of a leaking signal's level, at a vehicular reception (Rx) point, during a 1-second measuring session. The maximum ratio of 1.78 applies to a max speed of 60 mph and a minimum distance (Rmin) of 30 feet. This describes an example scenario, but even in in this example scenario, the field strength variation will not be so big. For another scenario, with a travel speed of 30 mph and a Rmin of 60 ft, the ratio is be only 1.07. For example, of means the same as changing 1.07 in µV/m or 0.58 dB in dBmV/m, a trivial difference.

The system 100, using real-time signal processing for upstream leakage detection enables a service provider (e.g., an Internet service provider, a content service provider, a communication service provider, a multiple-service operator (MSO), etc.) to provide a 100% probability of burst leak capture (POI). The variation of leak level(s) detected by the leak detection device 125 while traveling with the vehicle 126 is within one dB and therefore may be ignored. The system 100 enables the total time needed to have all user devices (cable modems) in a service group (SG) to burst leakage detection signals to be lowered, allowing the 1.6 MHz BW used for the OUDP burst to transmit upstream data part of the time.

Figure 5:
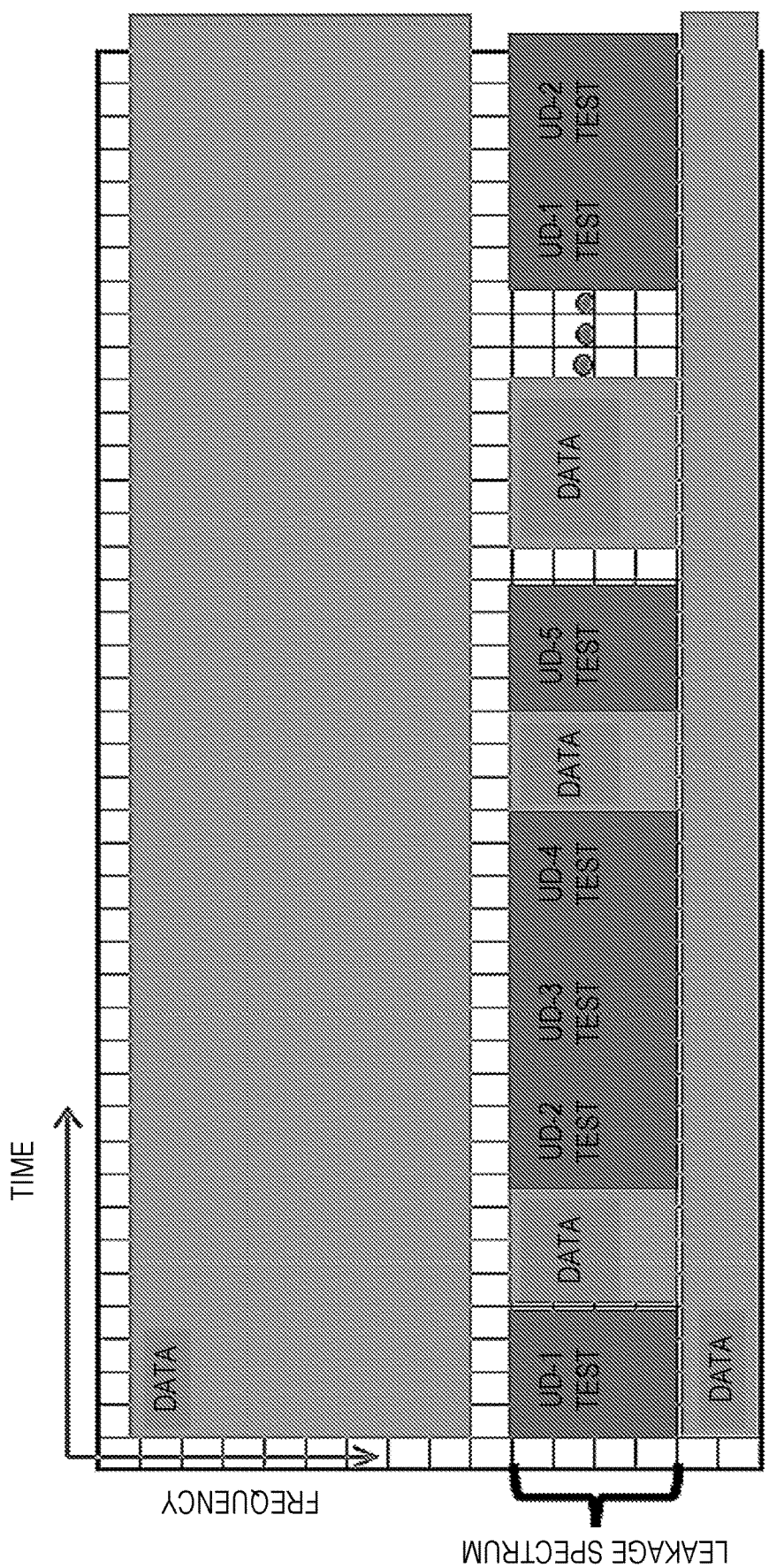
FIG. 5 shows an example chart of interleaved data and testing.

FIG. 5 shows an example of upstream leak detection test signaling output by five user devices within a service group interleaved with data, such as broadband data, customer traffic, content, and/or the like. This technique of maximizing the use of the spectrum for data, while also ensuring the reliability of leakage compliance, helps meet the goals of moving to the 204 MHz split for both capacity and 1 Gbps upstream performance.

Returning to FIG. 1, the system 100 enables/facilitates leakage test signaling to be sent to the user devices, for example, the user devices 112-117, based on any scenario. For example, the timing of when a user device outputs a leakage test signal, such as via an OUDP test burst, may be determined based on the leak detection device 125 determining the presence of a user device, such as the user device 112. For example, the user device 112 may output/broadcast an identifier associated with the user device 112, such as a network address, a service set identifier (SSID), a media access control (MAC) address, and/or any other type of identifier. The vehicle 126, when traveling the path 127, may cause the leak detection device 125 to enter an area/range within which the identifier output/broadcast by the user device 112 may be received, determined, and/or detected by the leak detection device 125.

Receiving, determining, and/or detecting the identifier may indicate that the leak detection device 125 is in proximity to the user device 112. The leak detection device 125 may send an indication/message to the computing device 124 that the identifier of the user device 112 was received, determined, and/or detected. The indication/message to the computing device 124 that the identifier of the user device 112 was received, determined, and/or detected may include information associated with the leak detection device 125, such as location information (e.g., GPS coordinates, etc.), travel speed (e.g., velocity, etc.) information, and/or any other information. The computing device 124, based on the indication/message, may determine signal information and the timing information, such as OUDP burst test signal (BTS) information. The signal information and the timing information may include and/or indicate, for example, the user device 112 and/or all user devices (e.g., the user devices 112-117, etc.) within a service group of the CMTS 103, a center frequency to be used for signaling, a number/quantity of minislots to be used, a frame count, a cycle number, status information, and/or the like. The computing device 124 may send the signal information and the timing information to the CMTS 103. The CMTS 103 may use the signal information and/or the timing information to cause the user device 112 and/or all user devices (e.g., the user devices 112-117, etc.) within a service group of the CMTS 103 to output a test signal that may be used to determine the existence of a signal leak and/or the location of a user device associated with a signal leak.

The timing of when a user device outputs a leakage test signal, such as via an OUDP test burst, may be determined based on a network device 128 (e.g., an access point, a gateway device, a user device, etc.) determining the presence of the leak detection device 125. For example, the leak detection device 125 may output/broadcast an identifier associated with the leak detection device 125, such as a network address, a service set identifier (SSID), a media access control (MAC) address, and/or any other type of identifier. The vehicle 126, when traveling the path 127, may cause the leak detection device 125 to be within an area/ range within which the identifier output/broadcast by the leak detection device 125 may be received, determined, and/or detected by the network device 128.

Receiving, determining, and/or detecting the identifier may indicate that the leak detection device 125 is in proximity to the user devices 112-117. The network device 128 may send an indication/message to the computing device 124 that the identifier of the leak detection device 125 was received, determined, and/or detected. The indication/message to the computing device 124 that the identifier of the leak detection device 125 was received, determined, and/or detected may include information associated with the network device 128 and/or the leak detection device 125, such as location information (e.g., GPS coordinates, etc.), travel speed (e.g., velocity, etc.) information, and/or any other information. The computing device 124, based on the indication/message, may determine signal information and the timing information, such as OUDP burst test signal (BTS) information. The signal information and the timing information may include and/or indicate, for example, some or all of the user devices 112-117, a center frequency to be used for signaling, a number/quantity of minislots to be used, a frame count, a cycle number, status information, and/or the like. The computing device 124 may send the signal information and the timing information to the CMTS 103. The CMTS 103 may use the signal information and/or the timing information to cause some or all of the user devices 112-117 to output a test signal that may be used to determine the existence of a signal leak and/or the location of a user device associated with a signal leak. For example, the leak detection device 125 may receive the test signal and use information (e.g., RSSI/signal power measures, determined frequencies, timing information, and/or the like) associated with receiving the test signal, as previously described, to determine the existence of a signal leak and/or the location of a user device associated with a signal leak.

Figure 6:
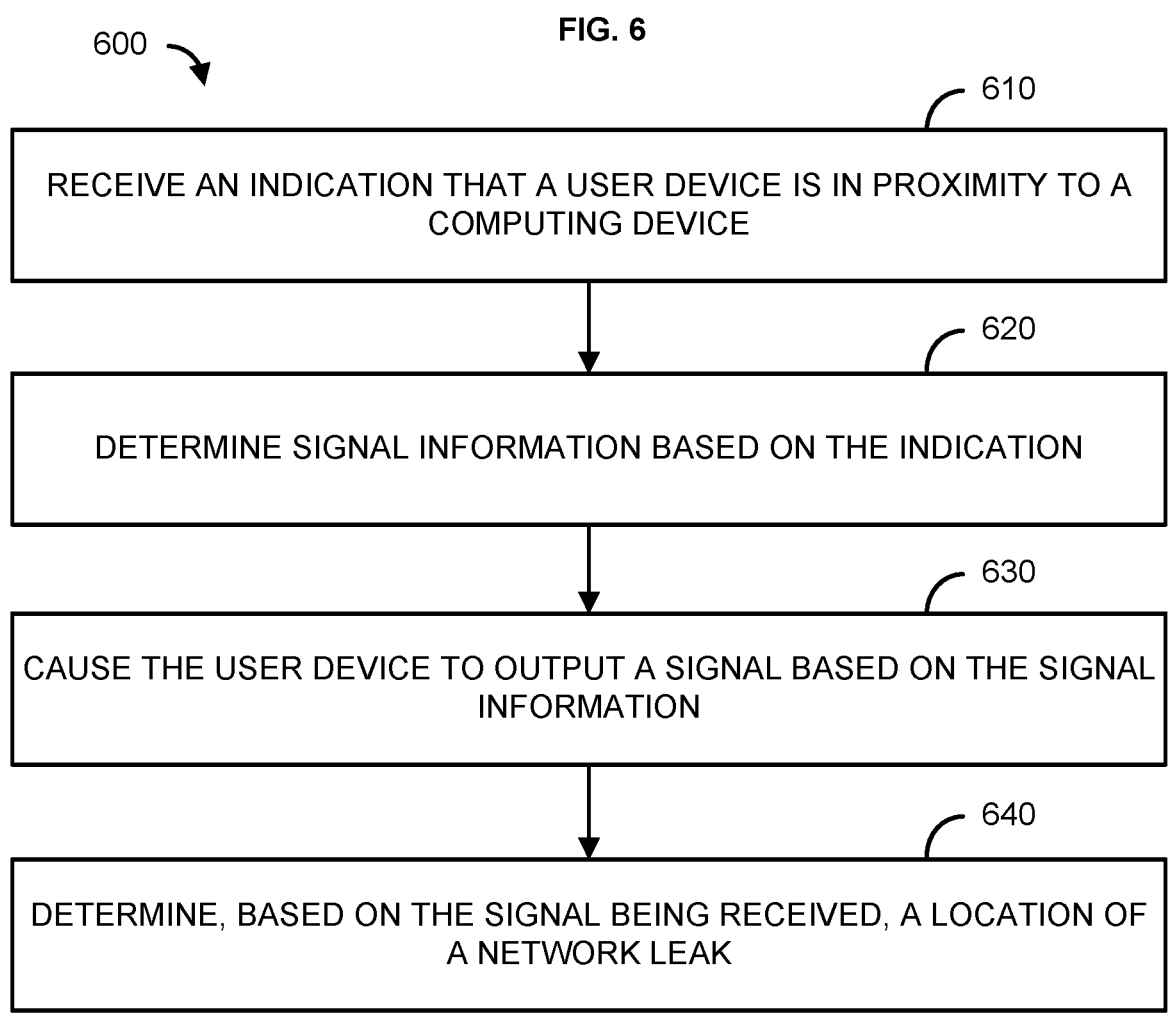
FIG. 6 shows a flowchart of an example method.

FIG. 6 shows a flowchart of an example method 600 for determining signal leaks within a network. For example, the method 600 may be used to determine signal leakage based on upstream data/traffic in an HFC network. Upstream leak detection test signaling output by user devices (e.g., cable modems, multimedia terminal adapters (MTA), set-top boxes, network terminals, the user devices 112-117, etc.), for example, user devices within a service group and/or service area of a network device (e.g., a cable modem termination system (CMTS), a virtual CMTS, a headend device, etc.) may be caused to output a signal, such as an OUDP burst test signal and/or the like, that may be interleaved with data, such as broadband data, customer traffic, content, and/or the like, and used to determine the existence of signal leaks in the network. For example, a signal caused to be output by a user device may be interleaved with broadband data, customer traffic, content, and/or the like, so that the actual signal that is a potential leak source in the HFC network is the same signal that is detected, for example, by the leak detection device. Maximizing the use of the spectrum for data, while also ensuring the reliability of leakage compliance, helps meet the goals of moving to the 204 MHz split for both capacity and 1 Gbps upstream performance. The method 600 may be implemented using the devices/components shown, described, and/or referenced in FIGS. 1-5.

The method 600 may include, at 610, receiving an indication that a user device (e.g., a cable modem, a multimedia terminal adapter (MTA), a set-top box, a network terminal, the user devices 112-117, etc.) is in proximity to a leak detection device (e.g., an FFT detection device, a signal analysis device, a computing device, the leak detection device 125, etc.). For example, a computing device (e.g., a server, a gateway, a network device, a modulation profile management device, etc.) may receive an indication that a user device is in proximity to a leak detection device. Receiving the indication that the user device is in proximity to the leak detection device may include receiving from the leak detection device, based on the leak detection device receiving an identifier of the user device, the indication that the user device is in proximity to the leak detection device. The identifier may include, for example, a network address, a service set identifier (SSID), a media access control (MAC) address, and/or any other type of identifier. The leak detection device may, for example, be within the broadcast range of the user device, causing the leak detection device to receive/determine the identifier.

For example, the user device may output/broadcast an identifier associated with the user device. The leak detection device may be configured with a vehicle (e.g., a service vehicle, a ride-share vehicle, a public service vehicle, a drone, etc.) and/or any other moving/movable object such as a user/person (e.g., a handheld device, etc.), a mobile phone, an animal (e.g., a dog, a bird, a squirrel, etc.) that enters an area/range within which the identifier output/broadcast by the user device may be received/determined by the leak detection device.

At 620, determining, based on the indication that the user device is in proximity to the leak detection device, signal information. For example, the leak detection device may send an indication/message to the computing device that the identifier of the user device was received/determined. The indication/message may include information associated with the leak detection device, such as location information (e.g., GPS coordinates, etc.), travel speed (e.g., velocity, etc.) information, and/or any other information. The computing device, based on the indication/message, may determine signal information (and/or timing information). The signal information may include a modulation profile. The signal information may indicate, for example, a signal strength, a signal frequency, signal timing (e.g., minislots, etc.). For example, the signal information may include OUDP burst test signal (BTS) information. The signal frequency may be, for example, associated with an aeronautical frequency band. The signal information may include and/or indicate, for example, the user device and/or all user devices within a service group, a center frequency to be used for signaling, a number/quantity of minislots to be used, a frame count, a cycle number, status information, and/or the like.

At 630, causing, based on the signal information, the user device to output a signal. Causing the user device to output the signal may include causing the signal information to be sent to the user device. For example, The computing device may send the signal information to a network device, such as a CMTS associated with the user device. The CMTS may use the signal information to cause the user device and/or all user devices (e.g., the user devices 112-117, etc.) within a service group of the CMTS to output a test signal that may be used to determine the existence of a signal leak and/or the location of a user device associated with a signal leak.

At 640, determining, based on an indication that the signal was received by the leak detection device, a location of a network leak. For example, determining the location of the network leak may include: receiving, from the leak detection device, the indication that the signal was received. The indication that the signal was received may also indicate the location of the leak detection device and the signal strength of the signal. For example, the leak detection device (and/or computing device) may receive the test signal and use information (e.g., RSSI/signal power measures, determined frequencies, timing information, and/or the like) associated with receiving the test signal to determine the existence of a network leak (e.g., signal leak, leakage, etc.) and/or the location of a user device associated with the network leak. For example, the location of the network leak may correspond to the location of the user device. The indication that the signal was received may also indicate a time the signal was received. For example, the leak detection device (and/or computing device) may receive the test signal and determine a time the signal was received. The time the signal was received may be compared to the time the signal was sent/output by the user device and/or a signal propagation time. The leak detection device may determine if the time the signal is received corresponds to the time the signal is expected to be received based on the time the signal is output by the user device and the signal propagation time. The location of the leak detection device when the signal is received and/or the time the signal is received may be used to determine the existence of a network signal leak.

Figure 7:
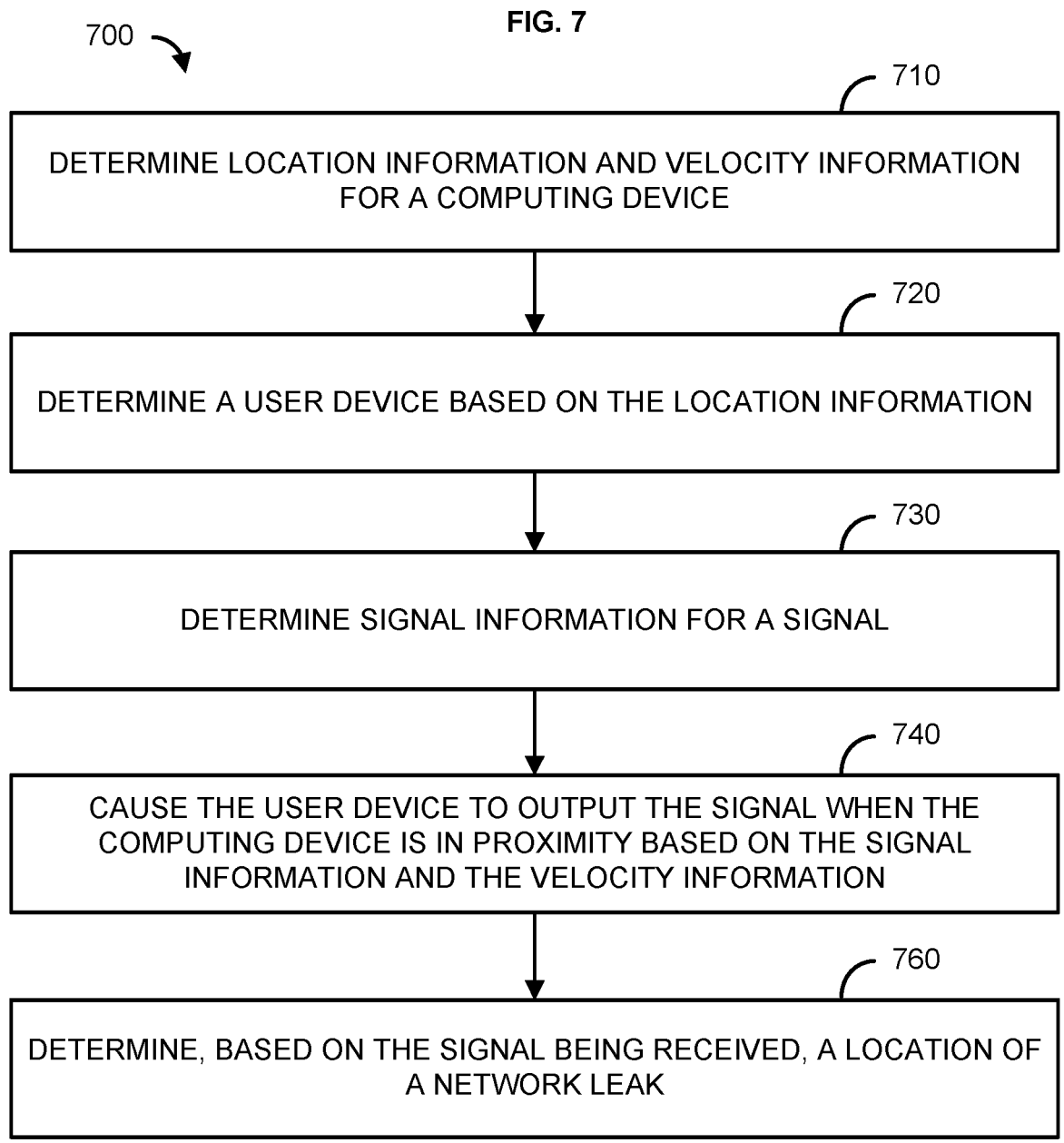
FIG. 7 shows a flowchart of an example method.

FIG. 7 shows a flowchart of an example method 700 for determining signal leaks within a network. For example, the method 700 may be used to determine signal leakage based on upstream data/traffic in an HFC network. Upstream leak detection test signaling output by user devices (e.g., cable modems, multimedia terminal adapters (MTA), set-top boxes, network terminals, the user devices 112-117, etc.), for example, user devices within a service group and/or service area of a network device (e.g., a cable modem termination system (CMTS), a virtual CMTS, a headend device, etc.) may be caused to output a signal, such as an OUDP burst test signal and/or the like, that may be interleaved with data, such as broadband data, customer traffic, content, and/or the like, and used to determine the existence of signal leaks in the network. For example, a signal caused to be output by a user device may be interleaved with broadband data, customer traffic, content, and/or the like, so that the actual signal that is a potential leak source in the HFC network is the same signal that is detected, for example, by the leak detection device. Maximizing the use of the spectrum for data, while also ensuring the reliability of leakage compliance, helps meet the goals of moving to the 204 MHz split for both capacity and 1 Gbps upstream performance. The method 700 may be implemented using the devices/components shown, described, and/or referenced in FIGS. 1-5.

The method 700 may include, at 710, determining location information associated with a leak detection device (e.g., an FFT detection device, a signal analysis device, a computing device, the leak detection device 125, etc.) and velocity information associated with the leak detection. Determining the location information and the velocity information may include a computing device (e.g., a server, a gateway, a network device, a modulation profile management device, etc.) receiving the location information and the velocity information from the leak detection device.

Determining the location information and the velocity information may include: determining, based on an indication from a network device (e.g., an access point, a gateway device, a user device, etc.) that a signal (and/or identifier) associated with the leak detection device is received, the location information associated with the leak detection. The indication that the signal associated with the leak detection is received indicates a time the signal associated with the leak detection is received and a location (e.g., GPS coordinates, etc.) of the network device. The computing device may receive an indication from a user device of the plurality of user devices that another signal (and/or identifier) associated with the leak detection device is received. The indication that the another signal (and/or the identifier) associated with the leak detection device is received may indicate a time that the another signal (and/or the identifier) associated with the leak detection device is received. The computing device may determine the velocity information based on a difference between the time when the another signal (and/or the identifier) associated with the leak detection device is received and the time when the signal (and/or the identifier) associated with the leak detection device is received.

At 720, determining, based on the location information associated with the leak detection device, at least one user device of a plurality of user devices. For example, a computing device may determine user devices within a service group and/or service area associated with the location information. The computing device may access a lookup table and/or database that associates locations and/or location information with user device locations, service areas, CMTS service groups, and/or the like.

At 730, determining signal information for at least one signal. For example, the computing device may determine the signal information. The signal information may indicate a time for a user device to output the at least one signal. Determining the signal information may include determining, based on the velocity information and a time associated with signal propagation, timing information. The computing device may determine, based on the velocity information and a location of the at least one user device, an estimated distance between the leak detection device and the at least one user device. The computing device may determine, based on the estimated distance, the signal information. The signal information may include a modulation profile. The signal information may indicate, for example, a signal strength, a signal frequency, signal timing (e.g., minislots, etc.). For example, the signal information may include OUDP burst test signal (BTS) information. The signal frequency may be, for example, associated with an aeronautical frequency band. The signal information may include and/or indicate, for example, the user device and/or all user devices within a service group, a center frequency to be used for signaling, a number of minislots to be used, a frame count, a cycle number, status information, and/or the like.

At 740, causing, based on the signal information and the velocity information, the at least one user device to output the at least one signal when the computing device is in proximity to the at least one user device. The at least one signal may be based on, for example, an orthogonal frequency division multiplexing upstream data profile (OUDP) test burst. Causing the user device to output the signal may include causing the signal information and/or timing information for the at least one signal to be sent to the user device. For example, The computing device may send the signal information and/or timing information for the at least one signal to a network device, such as a CMTS associated with the plurality of user devices. The CMTS may use the signal information (and/or timing information) to cause the at least one user device and/or each of the plurality of user devices (e.g., the user devices 112-117, etc.) within a service group of the CMTS to output a test signal that may be used to determine the existence of a signal leak and/or the location of a user device associated with a network leak (e.g., a signal leak, leakage, etc.).

At 750, determining, based on an indication that the computing device received the at least one signal, a location of a network leak. For example, determining the location of the network leak may include: receiving, from the leak detection device, the indication that the signal was received. The indication that the signal was received may also indicate a location of the leak detection device and a signal strength of the signal. For example, the leak detection device (and/or computing device) may receive the test signal and use information (e.g., RSSI/signal power measures, determined frequencies, timing information, and/or the like) associated with receiving the test signal to determine the existence of a network leak (e.g., signal leak, leakage, etc.) and/or the location of a user device associated with the network leak. For example, the location of the network leak may correspond to the location of the at least one user device.

Figure 8:
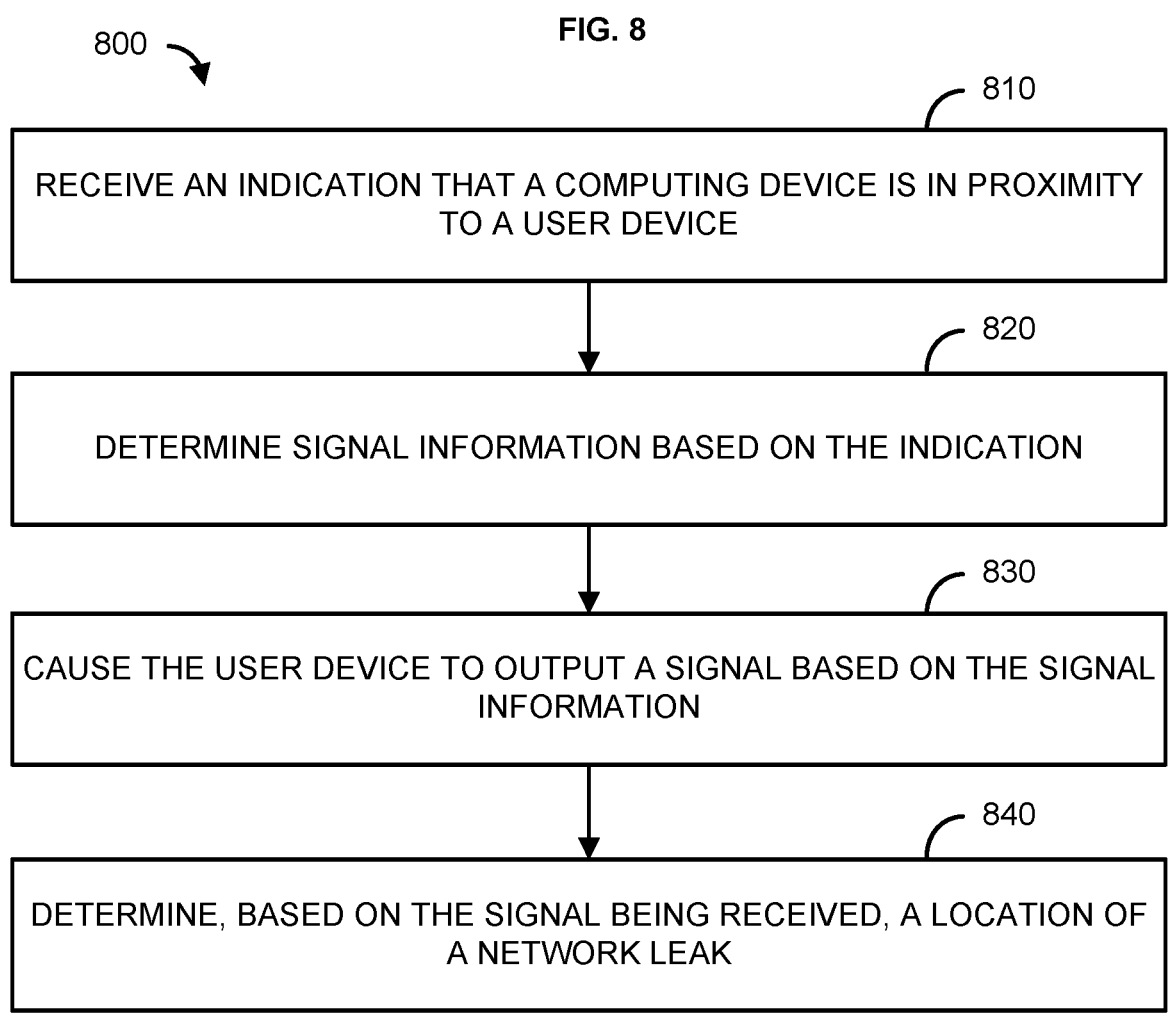
FIG. 8 shows a flowchart of an example method.

FIG. 8 shows a flowchart of an example method 800 for determining signal leaks within a network. For example, the method 800 may be used to determine signal leakage based on upstream data/traffic in an HFC network. Upstream leak detection test signaling output by user devices (e.g., cable modems, multimedia terminal adapters (MTA), set-top boxes, network terminals, the user devices 112-117, etc.), for example, user devices within a service group and/or service area of a network device (e.g., a cable modem termination system (CMTS), a virtual CMTS, a headend device, etc.) may be caused to output a signal, such as an OUDP burst test signal and/or the like, that may be interleaved with data, such as broadband data, customer traffic, content, and/or the like, and used to determine the existence of signal leaks in the network. For example, a signal caused to be output by a user device may be interleaved with broadband data, customer traffic, content, and/or the like, so that the actual signal that is a potential leak source in the HFC network is the same signal that is detected, for example, by the leak detection device. Maximizing the use of the spectrum for data, while also ensuring the reliability of leakage compliance, helps meet the goals of moving to the 204 MHz split for both capacity and 1 Gbps upstream performance. The method 800 may be implemented using the devices/components shown, described, and/or referenced in FIGS. 1-5.

The method 800 may include, at 810, receiving an indication that a leak detection device (e.g., an FFT detection device, a signal analysis device, a computing device, the leak detection device 125, etc.) is in proximity to a user device (e.g., a cable modem, a multimedia terminal adapter (MTA), a set-top box, a network terminal, the user devices 112-117, etc.) of a plurality of user devices (and/or a network device, such as an access point/gateway, associated with the plurality of user devices). For example, a computing device (e.g., a server, a gateway, a network device, a modulation profile management device, etc.) may receive an indication that a leak detection device is in proximity to a user device of a plurality of user devices. Receiving the indication that the leak detection device is in proximity to the user device may include receiving from the user device, based on the user device receiving an identifier of the leak detection device, the indication that the leak detection device is in proximity to the user device. The identifier may include, for example, a network address, a service set identifier (SSID), a media access control (MAC) address, and/or any other type of identifier. The user device may, for example, be within the broadcast range of the leak detection device, causing the user device to receive/determine the identifier.

For example, the leak detection device may output/broadcast an identifier associated with the leak detection device. The leak detection device may be configured with a vehicle (e.g., a service vehicle, a ride-share vehicle, a public service vehicle, a drone, etc.) and/or any other moving/movable object such as a user/person (e.g., a handheld device, etc.), a mobile phone, an animal (e.g., a dog, a bird, a squirrel, etc.) that enters an area/range within which the identifier output/broadcast by the leak detection device may be received/determined by the user device.

At 820, determining, based on the indication that the leak detection device is in proximity to the user device, signal information. For example, the user device may send an indication/message to the computing device that the identifier of the leak detection device was received/determined. The indication/message may include information associated with the user device, such as location information (e.g., GPS coordinates, etc.) and/or any other information. The indication/message may include information associated with the leak detection device, such as location information (e.g., GPS coordinates, etc.), estimated travel speed (e.g., velocity, etc.) information, and/or any other information.

The computing device, based on the indication/message, may determine signal information (and/or timing information). The signal information may include a modulation profile. The signal information may indicate, for example, a signal strength, a signal frequency, signal timing (e.g., minislots, etc.). For example, the signal information may include OUDP burst test signal (BTS) information. The signal frequency may be, for example, associated with an aeronautical frequency band. The signal information may include and/or indicate, for example, the user device and/or all user devices within a service group, a center frequency to be used for signaling, a number of minislots to be used, a frame count, a cycle number, status information, and/or the like.

At 830, causing, based on the signal information, the user device to output a signal. Causing the user device to output the signal may include causing the signal information to be sent to the user device. For example, The computing device may send the signal information to a network device, such as a CMTS associated with the user device. The CMTS may use the signal information to cause the user device and/or all user devices (e.g., the user devices 112-117, etc.) within a service group of the CMTS to output a test signal that may be used to determine the existence of a signal leak and/or the location of a user device associated with a signal leak.

At 840, determining, based on an indication that the signal was received by the leak detection device, a location of a network leak. For example, determining the location of the network leak may include: receiving, from the leak detection device, the indication that the signal was received. The indication that the signal was received may also indicate a location of the leak detection device and the signal strength of the signal. For example, the leak detection device (and/or computing device) may receive the test signal and use information (e.g., RSSI/signal power measures, determined frequencies, timing information, and/or the like) associated with receiving the test signal to determine the existence of a network leak (e.g., signal leak, leakage, etc.) and/or the location of a user device associated with the network leak. For example, the location of the network leak may correspond to the location of the user device. The indication that the signal was received may also indicate a time the signal was received. For example, the leak detection device (and/or computing device) may receive the test signal and determine a time the signal was received. The time the signal was received may be compared to the time the signal was sent/output by the user device and/or a signal propagation time. The leak detection device may determine if the time the signal is received corresponds to the time the signal is expected to be received based on the time the signal is output by the user device and the signal propagation time. The location of the leak detection device when the signal is received and/or the time the signal is received may be used to determine the existence of a network signal leak.

Figure 9:
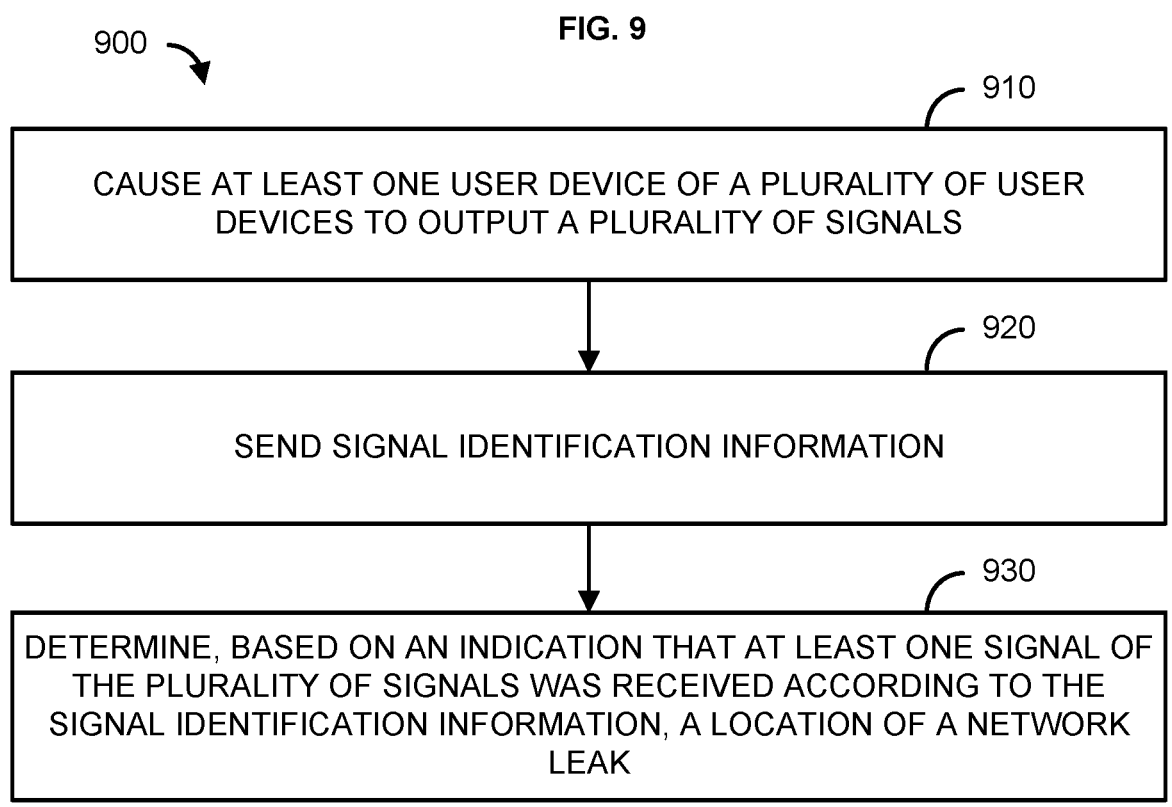
FIG. 9 shows a flowchart of an example method.

FIG. 9 shows a flowchart of an example method 900 for determining signal leaks within a network. For example, the method 900 may be used to determine signal leakage based on upstream data/traffic in an HFC network. Upstream leak detection test signaling output by user devices (e.g., cable modems, multimedia terminal adapters (MTA), set-top boxes, network terminals, the user devices 112-117, etc.), for example, user devices within a service group and/or service area of a network device (e.g., a cable modem termination system (CMTS), a virtual CMTS, a headend device, etc.) may be caused to output a signal, such as an OUDP burst test signal and/or the like, that may be interleaved with data, such as broadband data, customer traffic, content, and/or the like, and used to determine the existence of signal leaks in the network. For example, a signal caused to be output by a user device may be interleaved with broadband data, customer traffic, content, and/or the like, so that the actual signal that is a potential leak source in the HFC network is the same signal that is detected, for example, by the leak detection device. Maximizing the use of the spectrum for data, while also ensuring the reliability of leakage compliance, helps meet the goals of moving to the 204 MHz split for both capacity and 1 Gbps upstream performance. The method 900 may be implemented using the devices/components shown, described, and/or referenced in FIGS. 1-5.

The method 900 may include, at 910, causing at least one user device of a plurality of user devices (e.g., cable modems, multimedia terminal adapters (MTA), set-top boxes, network terminals, the user devices 112-117, etc.) to output a plurality of signals. A network device (e.g., a cable modem termination system (CMTS), a virtual CMTS, a headend device, etc.) may cause the at least one user device to output the plurality of signals. For example, the network device may receive signal information (and/or timing information) from a computing device (e.g., a server, a gateway, a network device, a modulation profile management device, etc.). The signal information may include one or more modulation profiles. The signal information may indicate, for example, a signal strength, a signal frequency, signal timing (e.g., minislots, etc.), and/or the like associated with each signal of the plurality of signals. For example, the signal information may include OUDP burst test signal (BTS) information. The signal frequency may be, for example, associated with an aeronautical frequency band. The signal information may include and/or indicate, for example, each user device of the plurality of user devices. The plurality of user devices may be associated with a service group and/or a service area serviced by and/or associated with the network device. The signal information may include and/or indicate, for example, a center frequency to be used for signaling, a number of minislots to be used, a frame count, a cycle number, status information, and/or the like.

The signal information may be used to cause each of the plurality of user devices to consistently, constantly, periodically, and/or the like output a signal that may be used to determine the existence of network signal leaks. For example, the network device, based on the signal information, may cause the at least one user device to output the plurality of signals. Causing the at least one user device to output the plurality of signals may include causing at least a portion of the signal information to be sent to the user device consistently, constantly, periodically, and/or the like.

At 920, sending signal identification information to a leak detection device (e.g., an FFT detection device, a signal analysis device, a computing device, the leak detection device 125, etc.). For example, the computing device may send the leak detection device the signal identification information. The signal identification information may include at least a portion of the signal information. For example, the signal identification information may include and/or indicate the signal strength, the signal frequency, signal timing (e.g., minislots, etc.), and/or the like associated with each signal of the plurality of signals output by each user device of the plurality of user devices. The signal identification information may be configured to facilitate the configuration of a filter (e.g., matched filter, etc.) within the leak detection device that may be used to determine/detect any signal output by a user device of the plurality of user devices.

The signal identification information may be sent to the leak detection device, for example, based on location information. The location information may include, for example, an indication that the leak detection device is in proximity to the at least one user device of the plurality of user devices. For example, the computing device may receive an indication that the leak detection device is in proximity to the at least one user device of a plurality of user devices. Receiving the location information may include receiving from the at least one user device, based on the at least one user device receiving an identifier of the leak detection device, the location information. The identifier may include, for example, a network address, a service set identifier (SSID), a media access control (MAC) address, and/or any other type of identifier. The at least one user device may, for example, be within a broadcast range of the leak detection device, causing the at least one user device to receive/determine the identifier. The computing device may receive location information that includes an indication that the at least one user device is in proximity to the leak detection device. Receiving the location information may include receiving from the leak detection device, based on the leak detection device receiving an identifier of the at least one user device, the location information. The identifier may include, for example, a network address, a service set identifier (SSID), a media access control (MAC) address, and/or any other type of identifier. The leak detection device may, for example, be within a broadcast range of the at least one user device, causing the leak detection device to receive/determine the identifier.

At 930, determining, based on sending the signal identification information and an indication that a signal of the plurality of signals output by the at least one user device was received by the leak detection device, a location of a network leak. For example, determining the location of the network leak may include: receiving, from the leak detection device, the indication that the signal was received. The indication that the signal was received may also indicate the location of the leak detection device and the signal strength of the signal. For example, the leak detection device (and/or computing device) may receive the test signal and use information (e.g., RSSI/signal power measures, determined frequencies, timing information, and/or the like) associated with receiving the test signal to determine the existence of a network leak (e.g., signal leak, leakage, etc.) and/or the location of a user device associated with the network leak. For example, the location of the network leak may correspond to the location of the at least one user device. The indication that the signal was received may also indicate a time the signal was received. For example, the leak detection device (and/or computing device) may receive the test signal and determine a time the signal was received. The time the signal was received may be compared to the time the signal was sent/output by the at least one user device and/or a signal propagation time. The leak detection device may determine if the time the signal is received corresponds to the time the signal is expected to be received based on the time the signal is output by the at least one user device and the signal propagation time. The location of the leak detection device when the signal is received and/or the time the signal is received may be used to determine the existence of a network signal leak.

Figure 10:
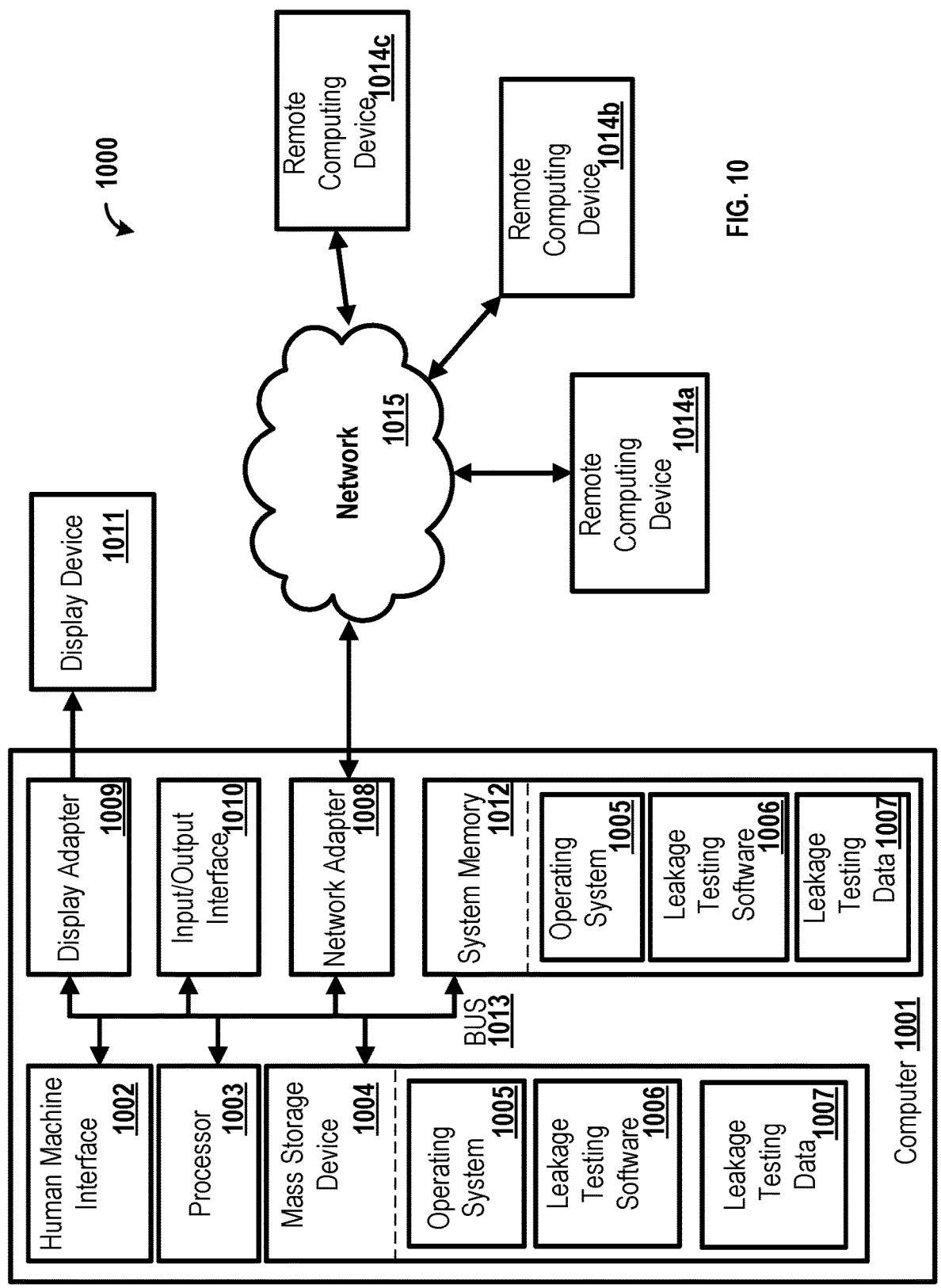
FIG. 10 shows a block diagram of a computing device for implementing the example methods.

FIG. 10 shows an example system 1000. Any device and/or component described herein may be a computer 1001 as shown in FIG. 10. The computer 1001 may comprise one or more processors 1003, a system memory 1012, and a bus 1013 that couples various components of the computer 1001 including the one or more processors 1003 to the system memory 1012. In the case of multiple processors 1003, the computer 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computer 1001 may operate on and/or comprise a variety of computer-readable media (e.g., non-transitory). Computer-readable media may be any available media that is accessible by the computer 1001 and comprises non-transitory, volatile, and/or non-volatile media, removable and non-removable media. The system memory 1012 has computer-readable media in the form of volatile memory, such as random access memory (RAM), and/or non-volatile memory, such as read-only memory (ROM). The system memory 1012 may store data such as leakage testing data 1007 and/or program modules such as operating system 1005 and leakage testing software 1006 that are accessible to and/or are operated on by the one or more processors 1003.

The computer 1001 may also comprise other removable/non-removable, volatile/non-volatile computer storage media. The mass storage device 1004 may provide non-volatile storage of computer code, computer-readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 1004. An operating system 1005 and leakage testing software 1006 may be stored on the mass storage device 1004. One or more of the operating system 1005 and leakage testing software 1006 (or some combination thereof) may comprise program modules and the leakage testing software 1006. Leakage testing data 1007 may also be stored on the mass storage device 1004. Leakage testing data 1007 may be stored in any of one or more databases known in the art. The databases may be centralized or distributed across multiple locations within the network 1015.

A user may enter commands and information into the computer 1001 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human-machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 via an interface, such as a display adapter 1009. It is contemplated that the computer 1001 may have more than one display adapter 1009 and the computer 1001 may have more than one display device 1011. A display device 1011 may be a monitor, an LCD (Liquid Crystal Display), light-emitting diode (LED) display, television, smart lens, smart glass, and/or a projector. In addition to the display device 1011, other output peripheral devices may comprise components such as speakers (not shown) and a printer (not shown) which may be connected to the computer 1001 via Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computer 1001 may be part of one device, or separate devices.

The computer 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 1001 and a remote computing device 1014a,b,c may be made via a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components may reside at various times in different storage components of the computing device 1001, and are executed by the one or more processors 1003 of the computer 1001. An implementation of leakage testing software 1006 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving an indication that a computing device is in proximity to a user device;
causing, based on the indication that the computing device is in proximity to the user device, the user device to output a signal; and
determining, based on an indication that the signal was received by the computing device, a location of a network leak.

2. The method of claim 1, wherein receiving the indication that the computing device is in proximity to the user device comprises receiving from the computing device, based on the computing device receiving an identifier of the user device, the indication that the computing device is in proximity to the user device.

3. The method of claim 1, wherein causing, based on the indication that the computing device is in proximity to the user device, the user device to output the signal comprises:
determining, based on the indication that the computing device is in proximity to the user device, signal information; and
causing, based on the signal information, the user device to output the signal.

4. The method of claim 3, wherein the signal information comprises a modulation profile.

5. The method of claim 3, wherein the signal information indicates at least one of: a signal strength, a signal frequency, or signal timing.

6. The method of claim 5, wherein the signal frequency is associated with an aeronautical frequency band.

7. The method of claim 1, wherein the signal is based on an orthogonal frequency division multiple access upstream data profile (OUDP) test burst.

8. The method of claim 1, wherein causing the user device to output the signal comprises causing signal information to be sent to the user device.

9. The method of claim 1, wherein determining the location of the network leak comprises:
receiving, from the computing device, the indication that the signal was received,
wherein the indication that the signal was received indicates a location of the computing device and a signal strength of the signal;
determining, based on the location of the computing device and the signal strength, a location of the user device; and
determining, based on the location of the user device, the location of the network leak, wherein the location of the network leak corresponds to the location of the user device.

10. An apparatus comprising:
one or more processors; and
a memory storing processor-executable instructions that, when executed by the one or more processors, cause the apparatus to:
receive an indication that a computing device is in proximity to a user device;
cause, based on the indication that the computing device is in proximity to the user device, the user device to output a signal; and
determine, based on an indication that the signal was received by the computing device, a location of a network leak.

11. The apparatus of claim 10, wherein the processor-executable instructions, when executed by the one or more processors, further cause the apparatus to receive the indication that the computing device is in proximity to the user device based on the computing device receiving an identifier of the user device.

12. The apparatus of claim 10, wherein the processor-executable instructions that, when executed by the one or more processors, cause the apparatus to cause, based on the indication that the computing device is in proximity to the user device, the user device to output the signal, further cause the apparatus to:
determine, based on the indication that the computing device is in proximity to the user device, signal information; and
cause, based on the signal information, the user device to output the signal.

13. The apparatus of claim 12, wherein the signal information comprises a modulation profile.

14. The apparatus of claim 12, wherein the signal information indicates at least one of: a signal strength, a signal frequency, or signal timing.

15. The apparatus of claim 14, wherein the signal frequency is associated with an aeronautical frequency band.

16. The apparatus of claim 10, wherein the signal is based on an orthogonal frequency division multiple access upstream data profile (OUDP) test burst.

17. The apparatus of claim 10, wherein the processor-executable instructions that, when executed by the one or more processors, cause the apparatus to cause the user device to output the signal, further cause the apparatus to cause signal information to be sent to the user device.

18. The apparatus of claim 10, wherein the processor-executable instructions that, when executed by the one or more processors, cause the apparatus to determine the location of the network leak, further cause the apparatus to:
receive, from the computing device, the indication that the signal was received,
wherein the indication that the signal was received indicates a location of the computing device and a signal strength of the signal;
determine, based on the location of the computing device and the signal strength, a location of the user device; and
determine, based on the location of the user device, the location of the network leak, wherein the location of the network leak corresponds to the location of the user device.

19. One or more non-transitory computer-readable media storing processor-executable instructions that, when executed by at least one processor, cause the at least one processor to:
receive an indication that a computing device is in proximity to a user device;

cause, based on the indication that the computing device is in proximity to the user device, the user device to output a signal; and determine, based on an indication that the signal was received by the computing device, a location of a network leak.

20. The non-transitory computer-readable media of claim 19, wherein the processor-executable instructions, when executed by the at least one processor, further cause the at least one processor to receive the indication that the computing device is in proximity to the user device based on the computing device receiving an identifier of the user device.

21. The non-transitory computer-readable media of claim 19, wherein the processor-executable instructions that, when executed by the at least one processor, cause the at least one processor to cause, based on the indication that the computing device is in proximity to the user device, the user device to output the signal, further cause the at least one processor to:

determine, based on the indication that the computing device is in proximity to the user device, signal information; and cause, based on the signal information, the user device to output the signal.

22. The non-transitory computer-readable media of claim 21, wherein the signal information comprises a modulation profile.

23. The non-transitory computer-readable media of claim 21, wherein the signal information indicates at least one of: a signal strength, a signal frequency, or signal timing.

24. The non-transitory computer-readable media of claim 23, wherein the signal frequency is associated with an aeronautical frequency band.

25. The non-transitory computer-readable media of claim 19, wherein the signal is based on an orthogonal frequency division multiple access upstream data profile (OUDP) test burst.

26. The non-transitory computer-readable media of claim 19, wherein the processor-executable instructions that, when executed by the at least one processor, cause the at least one processor to cause the user device to output the signal, further cause the at least one processor to cause signal information to be sent to the user device.

27. The non-transitory computer-readable media of claim 19, wherein the processor-executable instructions that, when executed by the at least one processor, cause the at least one processor to determine the location of the network leak, further cause the at least one processor to:

receive, from the computing device, the indication that the signal was received, wherein the indication that the signal was received indicates a location of the computing device and a signal strength of the signal;

determine, based on the location of the computing device and the signal strength, a location of the user device; and determine, based on the location of the user device, the location of the network leak, wherein the location of the network leak corresponds to the location of the user device.

28. A system comprising:

a user device configured to send an identifier associated with the user device;

a first computing device configured to:
receive the identifier associated with the user device; and
send, based on the identifier associated with the user device, an indication that the first computing device is in proximity to the user device; and a second computing device configured to:
receive the indication that the first computing device is in proximity to the user device;
cause, based on the indication that the first computing device is in proximity to the user device, the user device to output a signal; and
determine, based on the indication that the signal was received by the first computing device, a location of a network leak.

29. The system of claim 28, wherein the second computing device is configured to cause, based on the indication that the first computing device is in proximity to the user device, the user device to output the signal, the second computing device is further configured to:

determine, based on the indication that the first computing device is in proximity to the user device, signal information; and cause, based on the signal information, the user device to output the signal.

30. The system of claim 29, wherein the signal information comprises a modulation profile.

31. The system of claim 29, wherein the signal information indicates at least one of: a signal strength, a signal frequency, or signal timing.

32. The system of claim 31, wherein the signal frequency is associated with an aeronautical frequency band.

33. The system of claim 28, wherein the signal is based on an orthogonal frequency division multiple access upstream data profile (OUDP) test burst.

34. The system of claim 28, wherein the second computing device is configured to cause the user device to output the signal, the second computing device is further configured to cause signal information to be sent to the user device.

35. The system of claim 28, wherein the second computing device is configured to determine the location of the network leak, the second computing device is further configured to:

receive, from the first computing device, the indication that the signal was received, wherein the indication that the signal was received indicates a location of the first computing device and a signal strength of the signal;

determine, based on the location of the first computing device and the signal strength, a location of the user device; and determine, based on the location of the user device, the location of the network leak, wherein the location of the network leak corresponds to the location of the user device.

* * * * *